(12) United States Patent
Holland et al.

(10) Patent No.: US 11,323,700 B2
(45) Date of Patent: May 3, 2022

(54) ENCODING VIDEO USING TWO-STAGE INTRA SEARCH

(71) Applicant: Intel Corporation, Santa Clara, CA (US)

(72) Inventors: James M. Holland, Folsom, CA (US); Srinivasan Embar Raghukrishnan, Folsom, CA (US); Zhijun Lei, Portland, OR (US); Dmitry E. Ryzhov, Mountain View, CA (US); Lidong Xu, Beijing (CN); Satya N. Yedidi, Roseville, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/107,258

(22) Filed: Nov. 30, 2020

(65) Prior Publication Data

US 2021/0084294 A1 Mar. 18, 2021

Related U.S. Application Data

(63) Continuation of application No. 16/440,159, filed on Jun. 13, 2019, now Pat. No. 10,855,983.

(51) Int. Cl.
*H04N 19/11* (2014.01)
*H04N 19/533* (2014.01)
(Continued)

(52) U.S. Cl.
CPC ............. *H04N 19/11* (2014.11); *H04N 19/12* (2014.11); *H04N 19/159* (2014.11);
(Continued)

(58) Field of Classification Search
None
See application file for complete search history.

(56) References Cited

U.S. PATENT DOCUMENTS 6,097,832 A 8/2000 Guillotel et al.
6,876,702 B1 4/2005 Hui et al.
(Continued)

FOREIGN PATENT DOCUMENTS

WO 2013095322 6/2013

OTHER PUBLICATIONS

Masoumi et al., "Performance of HEVC Discrete Cosine and Sine Transforms on GPU using CUDA," IEEE 4th International Conference on Knowledge-Based Engineering and Innovation, Dec. 2017, 5 pages.
(Continued)

*Primary Examiner* — David N Werner
(74) *Attorney, Agent, or Firm* — Hanley, Flight & Zimmerman, LLC

(57) ABSTRACT

Example apparatus to encode video disclosed herein include an encoder to perform an intra search first stage based on source pixels of a source video frame to determine first intra candidates to predict a block of the source video frame. In disclosed examples, the encoder is also to perform an intra search second stage based on reconstructed pixels of neighboring blocks associated with the first intra candidates to determine a second intra candidate. In disclosed examples, the encoder is further to encode the block of the source video frame based on the second intra candidate.

18 Claims, 8 Drawing Sheets

(51) Int. Cl.
*H04N 19/159* (2014.01)
*H04N 19/176* (2014.01)
*H04N 19/88* (2014.01)
*H04N 19/70* (2014.01)
*H04N 19/593* (2014.01)
*H04N 19/33* (2014.01)
*H04N 19/12* (2014.01)
*H04N 19/60* (2014.01)

(52) U.S. Cl.
CPC ........... *H04N 19/176* (2014.11); *H04N 19/33* (2014.11); *H04N 19/533* (2014.11); *H04N 19/593* (2014.11); *H04N 19/70* (2014.11); *H04N 19/88* (2014.11); *H04N 19/60* (2014.11)

(56) References Cited

U.S. PATENT DOCUMENTS

| | | |
|---|---|---|
| 6,968,008 B1 | 11/2005 | Ribas-Corbera et al. |
| 6,981,119 B1 | 12/2005 | Lepak et al. |
| 7,551,673 B1 | 6/2009 | Oh et al. |
| 7,656,561 B2 | 2/2010 | Mølgaard et al. |
| 8,149,915 B1 | 4/2012 | Novotny et al. |
| 8,934,544 B1 | 1/2015 | Wang |
| 9,330,060 B1 | 5/2016 | Tsang |
| 9,398,297 B2 | 7/2016 | Gupta |
| 9,438,923 B2 | 9/2016 | He et al. |
| 10,068,309 B2 | 9/2018 | Fries et al. |
| 10,855,983 B2 * | 12/2020 | Holland ............... H04N 19/159 |
| 2001/0021303 A1 | 9/2001 | Bruls et al. |
| 2003/0091114 A1 | 5/2003 | Vissers et al. |
| 2003/0229719 A1 | 12/2003 | Iwata et al. |
| 2004/0111627 A1 | 6/2004 | Evans et al. |
| 2005/0276496 A1 | 12/2005 | Molgaard et al. |
| 2007/0110160 A1 | 5/2007 | Wang et al. |
| 2011/0058606 A1 | 3/2011 | Dencher |
| 2012/0219064 A1 | 8/2012 | Zheng et al. |
| 2013/0163671 A1 | 6/2013 | Korman et al. |
| 2013/0184007 A1 | 7/2013 | Hategan et al. |
| 2013/0266072 A1 | 10/2013 | Lee et al. |
| 2014/0098880 A1 | 4/2014 | Seregin et al. |
| 2014/0126638 A1 | 5/2014 | Sievers |
| 2014/0159464 A1 * | 6/2014 | Jarvis ........................ B62B 3/08 298/2 |
| 2014/0205012 A1 | 7/2014 | Lee et al. |
| 2014/0286433 A1 | 9/2014 | He et al. |
| 2015/0178077 A1 | 6/2015 | Srinivasan et al. |
| 2015/0181209 A1 | 6/2015 | Holland et al. |
| 2015/0264348 A1 | 9/2015 | Zou et al. |
| 2015/0276496 A1 | 10/2015 | Kellogg et al. |
| 2015/0279055 A1 | 10/2015 | Kaburlasos et al. |
| 2016/0073107 A1 | 3/2016 | Moon et al. |
| 2016/0225161 A1 | 8/2016 | Hepper |
| 2016/0269747 A1 | 9/2016 | Duenas et al. |
| 2016/0283391 A1 | 9/2016 | Nilsson et al. |
| 2016/0353122 A1 | 12/2016 | Krajcevski et al. |
| 2016/0373741 A1 * | 12/2016 | Zhao ................... H04N 19/463 |
| 2017/0076419 A1 | 3/2017 | Fries et al. |
| 2017/0094274 A1 | 3/2017 | Chien et al. |
| 2017/0178594 A1 | 6/2017 | Hasselgren et al. |
| 2017/0256024 A1 | 9/2017 | Abraham et al. |
| 2017/0345121 A1 | 11/2017 | Seiler |
| 2018/0041766 A1 | 2/2018 | Holland et al. |
| 2018/0041770 A1 | 2/2018 | Holland et al. |
| 2018/0063553 A1 | 3/2018 | Zhang et al. |
| 2019/0037227 A1 | 1/2019 | Holland et al. |
| 2019/0110045 A1 | 4/2019 | Zhao et al. |
| 2019/0260989 A1 | 8/2019 | Racape et al. |
| 2019/0297344 A1 | 9/2019 | Holland et al. |
| 2021/0176495 A1 * | 6/2021 | Iwamura ............. H04N 19/176 |

OTHER PUBLICATIONS

Sarwer et al., "Complexity Reduced Mode Selection of H.264/AVC Intra Coding," IEEE International Conference on Audio, Language & Image Processing, Jul. 2008, 5 pages.

Lin et al., "Efficient Algorithm for H.264/AVC Intra Frame Video Coding," IEEE Transactions on Circuits and Systems for Video Technology, vol. 20, No. 10, Oct. 2010, 6 pages.

United States Patent and Trademark Office, "Corrected Notice of Allowability," mailed in connection with U.S. Appl. No. 16/440,159, dated Oct. 7, 2020, 2 pages.

United States Patent and Trademark Office, "Notice of Allowance," mailed in connection with U.S. Appl. No. 16/440,159, dated Jul. 31, 2020, 8 pages.

United States Patent and Trademark Office, "Non-final Office Action," mailed in connection with U.S. Appl. No. 16/440,159, dated Apr. 15, 2020, 16 pages.

* cited by examiner

US 11,323,700 B2

ENCODING VIDEO USING TWO-STAGE INTRA SEARCH

RELATED APPLICATION(S)

This patent arises from a continuation of U.S. patent application Ser. No. 16/440,159, which is titled "ENCODING VIDEO USING TWO-STAGE INTRA SEARCH," and which was filed on Jun. 13, 2019. Priority to U.S. patent application Ser. No. 16/440,159 is claimed. U.S. patent application Ser. No. 16/440,159 is hereby incorporated herein by reference in its entirety.

BACKGROUND

A video stream may be encoded into a variety of video compression formats, or the characteristics of the stream may be changed. Characteristics of the video stream include, but are not limited to, the resolution and the bit rate of the video stream. Encoding may also be used when preparing the video stream for transmission between devices or components of computing devices.

BRIEF DESCRIPTION OF THE DRAWINGS

The same numbers are used throughout the disclosure and the figures to reference like components and features. Numbers in the 100 series refer to features originally found in FIG. 1; numbers in the 200 series refer to features originally found in FIG. 2; and so on.

DETAILED DESCRIPTION

Figure 1:
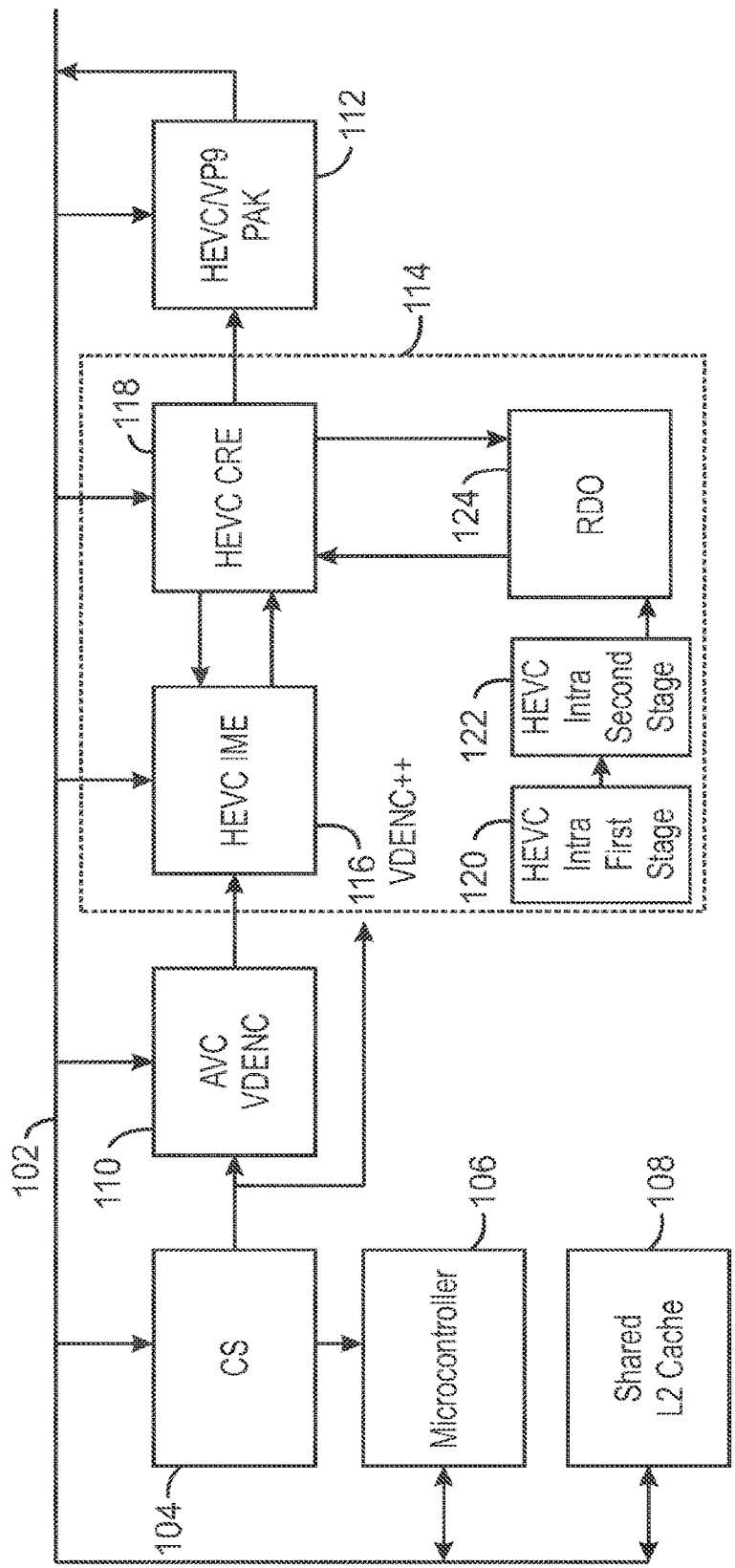
FIG. 1 is a block diagram illustrating an example system for encoding video using a two-stage intra search.

Some systems for encoding video may employ multiple programmable engines running kernel programs that use hardware co-processors. In addition, video may also be encoded using hardware-based Advanced Video Coding (AVC)-class encoders or High Efficiency Video Coding (HEVC)-class encoders. For example, AVC-class encoders may encode video according to the ISO/IEC 14496-10—MPEG-4 Part 10, Advanced Video Coding Specification, published May 2003. HEVC-class encoders may encode video according to the HEVC/H.265 specification version 4, which was approved as an ITU-T standard on Dec. 22, 2016.

Real-time and low power hardware encoders may be used in laptops, mobile phones, and the cloud. However, as encoders evolve and improve compression efficiency and quality, a challenge arises to maintain high performance. Additionally, as the number of new codecs increases and the current codecs persist in use, achieving the quality and performance goals may have silicon area constraints. In addition, rate distortion estimation offers more accurate estimates of the coding error, but utilizes a Discrete Cosine Transform (DCT) which is often very expensive to run at high speeds. Additionally each codec may have different types of DCT that alter the design of each.

The present techniques include techniques for improving the performance, quality, and extensibility of hardware video encoders. In embodiments, the present techniques improve an encoder that is without programmable engines executing the main loop of the encoder algorithms, so-called fixed function encoding. Fixed function encoding may be used, for example, in phones, tablets, computers, cameras, cars, game systems, and so on to perform a host of encoding tasks for real-time compression of pixels for any number of reasons. The present techniques include, but are not limited to, the following algorithms and techniques. First, a split intra search with two stages is provided. The intra search includes an intra first stage that is open loop with no feedback. An intra second stage is closed loop with feedback that enables a coarse search to feed a variable. Second, techniques including fine-grained enhancements to quickly compute the rate distortion estimation (RDE) cost of transform units (TUs) with interleaving of candidates are also provided. The candidates are potential encodings of a given block. Finally, techniques are provided for generalizing RDE stages to support multiple codecs and achieving an improved tradeoff of quality, area, and performance are provided.

The techniques described herein thus enable High Efficiency Video Coding (HEVC)-class video encoding to be implemented using hardware that efficiently encodes screen content. For example, the techniques describe herein may be used to encode video according to the second version of the HEVC standard, published May 2015, or version 0.6 of the VP9 Bitstream and Decoding Process Specification, published Mar. 31, 2016. Previous standards treated "macroblocks" as statically sized elements, while in newer tree recursive codecs, the encoder can evaluate when a pixel block should be split into finer "coding units" (CUs) or be made into larger CUs depending on many factors ultimately yielding the lowest bit cost with the highest visual quality. Additionally, previous standards treated each macroblock with a uniform prediction type (such as inter or intra prediction types) and uniform transform size (such as 8×8 or 4×4) while high efficiency standards allow for mixing of prediction types and mixing of transform sizes, both based on the encoder decision process. By contrast, the coding units of the present techniques are dynamically sized and may include any combination of different prediction types. Thus, the rate distortion optimization of HEVC-class encoding with screen content improvements may be used to achieve significant compression gains over AVC-class encoders, including software or hardware based encoders, as well as HEVC-class encoders. Such a hardware implementation may provide better power and performance over software-based solutions. The techniques thus enable real-time HD and 4K encoding on devices with limited processing capabilities, such as mobile devices. Moreover, the techniques may provide compatibility with multiple recursive-based codecs and multiple formats using a singular engine. Finally, increasing compression efficiency while maintaining real time performance improves a number of end-user visible improvements with higher quality video encoding. The potential usages of the present techniques include video conferencing, video game streaming, remote hosted desktop accessing, screen recording, etc. Additionally these usages transcend codec standards, with all video standards desiring the highest quality experiences across the largest number of usage models. The techniques directly improve quality of solutions, while maintaining higher performance without significant silicon area or power costs.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

Some embodiments may be implemented in one or a combination of hardware, firmware, and software. Some embodiments may also be implemented as instructions stored on a machine-readable medium, which may be read and executed by a computing platform to perform the operations described herein. A machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices; or electrical, optical, acoustical or other form of propagated signals, e.g., carrier waves, infrared signals, digital signals, or the interfaces that transmit and/or receive signals, among others.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the inventions. The various appearances of "an embodiment," "one embodiment," or "some embodiments" are not necessarily all referring to the same embodiments.

FIG. 1 a block diagram illustrating an example system for hardware video encoding using a two-stage intra search. The example system 100 can be implemented in the electronic device 700 of FIG. 7 below. For example, the system 100 may be implemented using the encoder 728 and microcontroller 752 of the electronic device 700.

The system 100 includes a memory/cache interface 102 that is communicatively coupled to a command streamer (CS) 104, a microcontroller 106, a shared L2 cache 108, a video encoder AVC VDENC 110, an HEVC/VP9 hardware bit packer (PAK) 112, and an enhanced video encoder VDENC++ 114. The enhanced video encoder VDENC++ 114 further includes an HEVC integer motion estimator 116 and an HEVC check and refinement engine (CRE) 118. The enhanced video encoder VDENC++ 114 further also includes an HEVC Intra First Stage 120, an HEVC Intra Second Stage 122, and a rate distortion optimization unit (RDO) 124.

As shown in FIG. 1, the CS 104 may receive a set of commands from the memory/cache interface 102 and send information to the microcontroller 106. For example, the CS 104 may be a buffer in memory that software running on the host CPU or microcontroller can use to inject command buffers to the hardware fixed function. For example, a host may advance a head pointer, while the hardware consumes the commands and advances the tail pointer. The hardware cannot advance the tail pointer beyond the head pointer and the software cannot advance the head pointer beyond the tail pointer. In some examples, the information may include commands used to control whether a second pass is to be executed or not based on rate control analysis. For example, as the CS 104 is the unit in charge of dispatching jobs, the CS 104 may dispatch the job again based on microcontroller stats, before proceeding to next job. The microcontroller 106 may send and receive information to and from the memory cache interface 102. For example, the information may include statistics such as microcontroller statistics, video encoder statistics, PAK statistics, and conditional pass flag statistics. The shared L2 cache 108 may also send and receive information to and from the memory/cache interface 102. For example, the information may include shared pixels between video encoder 114 and the PAK 112. For example, if the video encoder 114 load a given block of pixel data, then PAK 112 may not have to load the block of pixel data from memory when it comes time to perform a PAK on a given LCU\CU, etc. The PAK 112 may access the particular block of pixel data from the shared L2 cache 108 instead of a slower memory. The CS 104 may send a state to the video encoder 110 and a state to the enhanced video encoder 114. For example, the states may be control information, such as frame or tile type, target QP, various enables or disables based on application controls, etc. In some examples, state may also include source pixels.

The video encoder 110 may also receive video from the memory/cache interface 102 in addition to the state. For example, video or other sequences of visual images may be presented as a series of frames or tiles or sets of pixels. As used herein, a tile refers to a mosaic pattern that fills a whole frame. A frame may thus be composed of many tiles potentially. Each individual tile can be repeated before proceeding to the next tile to increase efficiency in scenarios where a scene change may have occurred. For example, rather than waiting for a whole frame to be improperly encoded on scene changes, at the completion of the first tile the encoder can repeat just that one tile and update the future tiles to be aware the scene change occurred. If there are 4 tiles per frame, this may take 1.25× the time of 1 frame whereas frame based repetition may take 2×, assuming that the first tile detected the misprediction and the process is repeated.

In some examples, each tile can be decoded independently. For example, in HD vs UHD resolutions, of 1920× 1080 or 3840×2160 up to 7680×4320, respectively, without the use of tiles, a decoder may have to decode 7680 pixels wide before advancing to the next row of LCUs. This may put pressure on the decoder to hold a large amount of temporary information that could be referenced by the next row. In some examples, the frame can be split into 8 tiles, each 1920 wide and still 4320 tall. For example, the decoder can decode the frame like a newspaper column strip before moving to the next column. Tiles can also be used to reduce the height of a frame as well. If a tile is 1920×1080 in size, a 7680×4320 frame may include 4×4 tiles (4×1920 by 4×1080=7680×4320). However, in some examples, the tile size can also be set to the frame size, resulting in 1×1 tiles. The video encoder 110 can perform two stages of motion estimation. Motion estimation can be used to exploit the redundancy between adjacent frames or tiles to achieve compression by selecting a frame or tile as a reference frame or tile and predicting subsequent frames or tiles from the reference frame or tile. The prediction may be described by a plurality of motion vectors. In particular, the video encoder 110 may perform a hierarchical motion estimation search and an integer motion estimation search on the received frames or tiles. In motion estimation, the current frame or tile in a sequence of frames or tiles is predicted, usually from at least one reference frame or tile. In some examples, the movement of objects in a sequence of frames or tiles can be analyzed to obtain vectors that represent the estimated motion of the objects between frames or tiles. In some examples, each frame or tile can be divided into coding units (CUs), and the motion vectors represent the change in position of a CU between frames or tiles. A CU may be an adjustable block of pixels. For example, a CU may be a block of pixels sixteen by eight pixels in size.

A current frame or tile may thus be divided into CUs such that each CU is compared to a region in the reference frame or tile of the same size using an error measure, and the best matching region is selected. The search is conducted over a search area. A motion vector denoting the displacement of the region in the reference frame or tile with respect to the CU in the current frame or tile is determined. In some examples, the video encoder 110 can use multiple reference frames or tiles as downscaled references which are searched to provide candidates for a full resolution IME search. For example, the IME may be performed to find a temporal match. Moreover, motion estimation of subsequent blocks can be made prior to a complete mode decision being made on a previous block. Such a motion estimation is made as a heuristic of an approximate or pseudo prediction, which may violate the precise decoder specification but may be close enough for the encoder and encoding decisions in the majority of CUs. The prediction mode may also determine the number of passes made to compress the current frame or tile size into a target frame or tile size. The video encoder 110 may then output one or more search centers to be refined by the enhanced video encoder 114 and used to generate PAK coding unit (CU) objects sent to the HEVC/VP9 PAK 112 for encoding the video frame. Thus, the VDENC++ 114 can be included in a system to enable HEVC/VP9 class hardware encoding of video.

The enhanced video encoder VDENC++ 114 may include a third stage of motion estimation, the HEVC IME 116. As described in greater detail below with respect to FIG. 2, the HEVC IME 116 can generate shape candidates and receive predicted motion vectors from the HEVC CRE 118. The HEVC CRE 118 can perform a number of functions. For example, the HEVC CRE 118 can perform skip checks, fractional motion estimation, bi-directional motion estimation, intra-frame angular prediction, and mode decision making. A skip check may be a spot check of a specific location of a previous frame or tile to see how well the specific location matches a predicted motion vector. The skip check may be used to determine when encoding for a CU should be skipped, such that no vector information for a given CU is generated. The skip check is confirmed when the current CU follows the same motion pattern as the neighboring CUs, whether they are static or following a translation motion. In the case of a skip, no information may be generated for the associated CU.

In some examples, the HEVC CRE 118 can perform a fractional motion estimation (FME) based on the image frame or tile and/or partition information. For example, selected CU candidates with their motion vectors can be further searched in the fractional motion resolution. After partitioning, the resulting motion vectors may be at an integer resolution. For example, the motion vectors for each CU shape may be per pixel. Various coding specifications may specify resolutions halfway between pixels or even quarter resolutions between pixels to be more precise. For example, an object moving from frame to frame or tile to tile may not move a whole pixel between the two frames or tiles. Instead, the object may move only half a pixel. Thus, a half fractional resolution may enable such a motion to be captured. In some examples, the motion vectors can be encoded and stored or transmitted to a decoder.

In some examples, the HEVC CRE 118 can perform bidirectional motion estimation. For example, the HEVC CRE 118 may locate an object in both future and past frames or tiles and blend the two of them together to average the predicted results. Thus, the resulting predicted motion vectors may be more accurate than either a motion vector predicted solely on a past frame or tile or a motion vector predicted solely on a future frame or tile. In some examples, the frames or tiles can be re-ordered differently from the display order. For example, if a display order for 5 frames is 0, 1, 2, 3, 4, then the frames can be encoded in the order 0, 2, 1, 4, 3 (or IPBPB in this example). Frames 1 and 3 can predict from the past (0) and the future (2). Such a reordering may produce better compression.

In some examples, the HEVC CRE 118 can perform intra-frame or intra-tile prediction. For example, a scene change or other major change may have occurred such that the object does not exist in any past frame. Thus, the motion vectors must be predicted entirely from pixels from within the frame. The HEVC CRE 118 can analyze pixels above and to the left of each pixel, and select an angle in which the pixels can be copied. For example, horizontal patterns may be copied horizontally and vertical patterns may be copied vertically. In some examples, there may be a number of predetermined angles between the horizontal and vertical axes to select from. For example, a higher performance mode may include searching with less IME predictor candidates. In some examples, normal performance may be a balance of quality and execution time of given frame. A higher performance mode may reduce the execution time at the cost of some quality. A lower performance mode may increase the quality while also increasing the execution time. In some examples, the HEVC CRE 118 can check all 35 angles in both normal and lower performance modes (providing higher quality), but may reduce the angles searched in higher performance (lower quality) for some CU levels. For example, the HEVC CRE 118 can reduce the angles for 32×32 CU only, and not 16×16 or 8×8, and continue to search all angles there.

In some examples, for the IME search, a normal performance mode of the HEVC IME 116 may use 8 candidates. In a high performance mode, the HEVC IME 116 may use only 4 candidates for the IME search to save time by performing less calculations. In a higher quality or lower performance mode, the HEVC IME 116 may search 12 candidates for the IME search. In various examples, the HEVC IME 116 can also perform TBC IME candidate searches.

In some examples, for the HME search, in a normal performance mode, the AVC video encoder 110 may only consider one reference frame. In a higher quality mode, the AVC video encoder 110 may consider more than one reference frame.

In some examples, support may be provided for multiple codecs, including the VP9 codec in particular. For example, HEVC and VP9 are different in the skip and collocated motion vector (MV) list. For example, only the nearest neighbor is considered for VP9. Since VP9 also uses different transform and quantization methods, the RDO computation described below may need to consider 0-255 quantization steps. Furthermore, a different transform matrix may be used. In addition, a bit rate estimation may be based on probability. Neighbor pixels smoothing may also be disabled for VP9. Additionally, a MPM list derivation, mode mask, partition mask, may be provided for VP9 support. In some examples, intra true motion support may also be included for 4×4, 8×8, 16×16, 32×32 and non-square shapes. Non square intra prediction may also be provided for 16×8/8×16, 32×16/16×32, 8×4/4×8 shapes. Furthermore, reference frame size scaling may be provided on the fly when executing motion searches.

The type of prediction made for each frame may be referred to as a mode decision. For example, the HEVC CRE 118 can determine whether to encode frames based on any of the various types of prediction, including skip checks, fractional motion estimation, bi-directional motion estimation, intra-frame motion estimation, left block copy, and palette prediction. To determine the particular encoding mode, the HEVC CRE 118 can make a mode decision based on motion estimation. In particular, the output of motion estimation may be used to determine an encoding cost of each different modes that might be applied to encode the current image frame. This may result in selection of the mode that exhibits least cost in one implementation. In some examples, the HEVC CRE 118 may choose a mode that is a closest match to the original image and consumes the least amount of bits to transmit in the bit stream. For example, the four modes of prediction may result in a closely matching image, but one of the prediction modes may consume less bits than the rest. The HEVC CRE 118 may thus select the prediction mode resulting in less bits. In some examples, the HEVC CRE 118 may base the mode decision on a rate distortion optimized (RDO) cost received from the RDO 124. For example, the RDO cost may be calculated by a forward transform and quantization (FTQ) module (not shown) of the RDO 124 based on candidates received from the CRE 118. In some examples, an FTQ module (not shown) may calculate the RDO cost using a discrete cosine transformation (DCT) and a quantization. The FTQ module may also estimate the amount of bits used to transmit a block based on an amount of error to correct. The RDO 124 can send the RDO costs for various mode decisions to the CRE 118, as indicated by an arrow. The RDO 124 can also receive data from the CRE 118 for calculating RDO costs, as indicated by an arrow. The data can include a bit cost estimate, instructions, and predicted pixels.

In some examples, the HEVC CRE 118 can compare different combinations of coding units based on their combined RDO costs as determined by the RDO 124. For example, a 16×16 coding unit may be compared to any combination of four 8×8 coding units. Likewise, differently estimated 32×32 coding units may be compared with different combinations of 4×4 coding units. Similarly, a 64×64 coding unit may be compared with various combinations of four 32×32 coding units. The HEVC CRE 118 can then make a final decision as to which coding units or largest coding units to send to the PAK 112.

The prediction mode selected may also determine the number of passes made to compress the current frame size into a target frame size. In some examples, the target frame size may be determined by an application or driver. In some cases, several passes are made to determine if the current frame size is equal to the target frame size, wherein a pass is a single iteration through a portion of the encoder that is used to achieve the target frame size. The target frame size may be specified by a rate control module (not shown). In some examples, the number of passes to bring the current frame to the size of the target frame is limited by the mode for each frame. With each pass, a quantization parameter may be modified to achieve the target frame size. In various examples, the mode decisions selected by the CRE 118 are sent to the PAK 122.

The PAK 112 can encode the video based on the received mode decisions and generate a statistics stream. The statistics stream can include various parameters that are gathered during encoding and can be returned to memory for use by another process or to tune the encoder further for better compression or quality. For example, the statistics from the PAK 112 may include the actual bit amount of bits used to transmit a CU. In some examples, the statistics stream may include sum of square error (SSE) classifier cubes. For example, a final accurate SSE between the source and decoded picture can be generated in the PAK 112 and classified into various groups for faster software analysis by the microcontroller 106. In some examples, this binning can be performed by marking low and high thresholds of the SSE based on motion vector length of inter CUs or intra distortion, and specific regions-of-interest in the frame. In some examples, the microcontroller 106 may have a frame re-encoded in response to detecting an error beyond a threshold. In some examples, the microcontroller 106 may specify an adjustment value for a prediction parameter for future frames to be encoded with less error in response to detecting an error below a higher threshold but greater than a lower threshold. In some examples, an application can specify an adjustment value for tuning the thresholds. For examples, some applications may be more tolerant while some other applications may be stricter. In this way, the thresholds may be tuned to support more usages than if the thresholds were set at static values.

In addition, the PAK 112 can generate reconstructed video frames to be used for motion estimation. The reconstructed frames can be saved to memory, such as the shared L2 cache 108. In some examples, the 10 bit or 12 bit input can be truncated to the 8 most significant bits (MSB) in the source and the reconstructed image can be written to the memory 108 in a split format sending the 8 bit MSB to one region of memory 108 with the 2 bit or 4 bit of least significant bits (LSB) to another region of memory 108. This allows the motion estimation to use only the 8b MSB for searching while the 10b and 12b original values can be used in the motion compensation of the PAK 112, substantially reducing bandwidth and increase quality on noisy content.

As illustrated in FIG. 1, the PAK 112 receives and transmits data to/from the memory/cache interface 102. In some examples, the shared L2 cache 108 may be a shared cache between the encoding process performed by AVC VDENC 110 and VDENC++ 114, and the PAK 112. Video encoding may include both motion estimation and motion compensation. Motion estimation is the process of searching for a best motion vector. Motion compensation is the process of taking a specified motion vector and then predicting pixels at the location of the motion vector that can then be used for encoding. Each of the encoding components 110, 116, 118, and 112 may receive pixels to be processed from the memory/cache interface 102. Specifically, the encoding process loads pixels for searching and determining the motion vectors, and the PAK 112 processes pixels to apply motion to the location specified by the motion vectors. The shared L2 cache 108 is a common cache that the processes can access to read/write data. Thus, in some examples, when data is first loaded for encoding, those pixels remain in the shared L2 cache 108 long enough for the PAK process 112 to find each specific pixel needed for motion compensation. In some examples, this shared L2 cache 108 thus prevents loading and transmitting the pixels twice. In some examples, the shared L2 cache 108 may include variable register transfer logic (RTL) cache capacity declaration pairing with column tile width walking patterns. In some examples, where memory bandwidth must be minimized and an on-chip cache must be minimally sized, a tile-width cache can be used instead of a frame-width cache.

FIG. 1 does not show various costings that can be applied to each decision made by the AVC VDENC 110, the HEVC IME 116, and the HEVC CRE 118. A software driver may have information that is used to override any of the functions described above through costings. Moreover, the microcontroller 106 may also have information that is used to override any of the functions described above through costings. In some examples, the costings may be weights and controls that are used to essentially bias decisions throughout the process. For example, in the HEVC CRE 118 various candidate motion estimations may be compared with skip candidates. In some cases, the raw numbers that are derived and used for the comparison may result in a coding unit that would not be selected when information is available that could influence the coding unit choice. In some examples, some a priori knowledge or pre-determined values may suggest if the three candidates are close, then always take the skip as the best choice. These costings result in a programmable weight from some other source. The costings can be then distributed to bias decisions and selections at each search or decision. The costings enable a high degree of programmability with each searching function, even when fixed function hardware units are used. Thus, the present techniques enable a high degree of reusability for different applications.

In some examples, the costings can be used to create a re-configurable encoding pipeline. For example, various costings and/or parameters can be used to bias the mode decisions during encoding. Parameters such as the quantization parameter (QP) can be adjusted to bias the mode selection based on different content types, available bandwidth, resolution, targeted codec and bit budgets. In embodiments, for subjective video optimization, each QP can be adjusted for each CU individually to promote quality in some cases and hide visual artifacts in regions that are less visible. Put another way, the QP as a costing enables a direct control feedback loop where by changing the QP bias up or down, the present techniques can improve how the user perceives a video quality by increasing artifacts where the user is not looking and decreasing artifacts where the user is looking. Multiple stages of user programmable thresholds can be used to control the QP. A Stage1 QP can be based on the relative distortion of this block to the rest of the frame in quartiles. Each quartile may have its own change in QP or deltaQP. A Stage2 QP can be based on mode specific information, such as the intra-prediction mode type or the motion vector length for inter-prediction. A Stage3 QP can be based on a user-specified region of interest map with multiple levels of associated deltaQPs. Each delta may be combined and clamped if necessary before and after combination with the sliceQP.

In cases where a integer QP value produces a frame that significantly exceeds a target bit budget and one QP higher integer value produces a frame that significantly undershoots the target bit budget, a fractional precision QP between the two nearest integer QP values may be used and the lower and higher integer QP values may be proportionally assigned throughout the frame so that the average of the CU QP for the entire frame allows for more accurate results to meet the target bit budget with a lesser amount of overshoot and undershoot.

In some examples, a quantization parameter is a value that is used to divide the coefficients of the current frame in order to obtain values for the target frame size. A higher quantization parameter may result in more zero coefficients that do not have to be encoded to reduce the bitrate at the expense of quality. Accordingly, the frames may be sized in such a manner that the number of bits per frame comports with the bit rate of the encoding format of the target video stream. In some cases, an encoder may perform motion estimation again to determine the finer motion vectors and CU types of the frames after the bit rate control has been applied to each frame. In some examples, an additional fourth stage can make per coding unit adjustments based on motion length. For example, a motion can be classified as static motion, low motion, or high motion. Because the human visual system may be more sensitive to artifacts on static objects than objects with high motion, the QP can be decreased in areas of static motion or low motion, and increased in areas of high motion, respectively, to blur details and enhance encoding accordingly.

The diagram of FIG. 1 is not intended to indicate that the example system 100 is to include all of the components shown in FIG. 1. Rather, the example system 100 can be implemented using fewer or additional components not illustrated in FIG. 1 (e.g., additional motion estimators, feedback loops, microcontrollers, passes, etc.). For example, the VDENC++ may also include separate modules for FTQ and a final decision module (not shown) separate from the HEVC CRE 118 to make final decisions regarding units.

Figure 2:
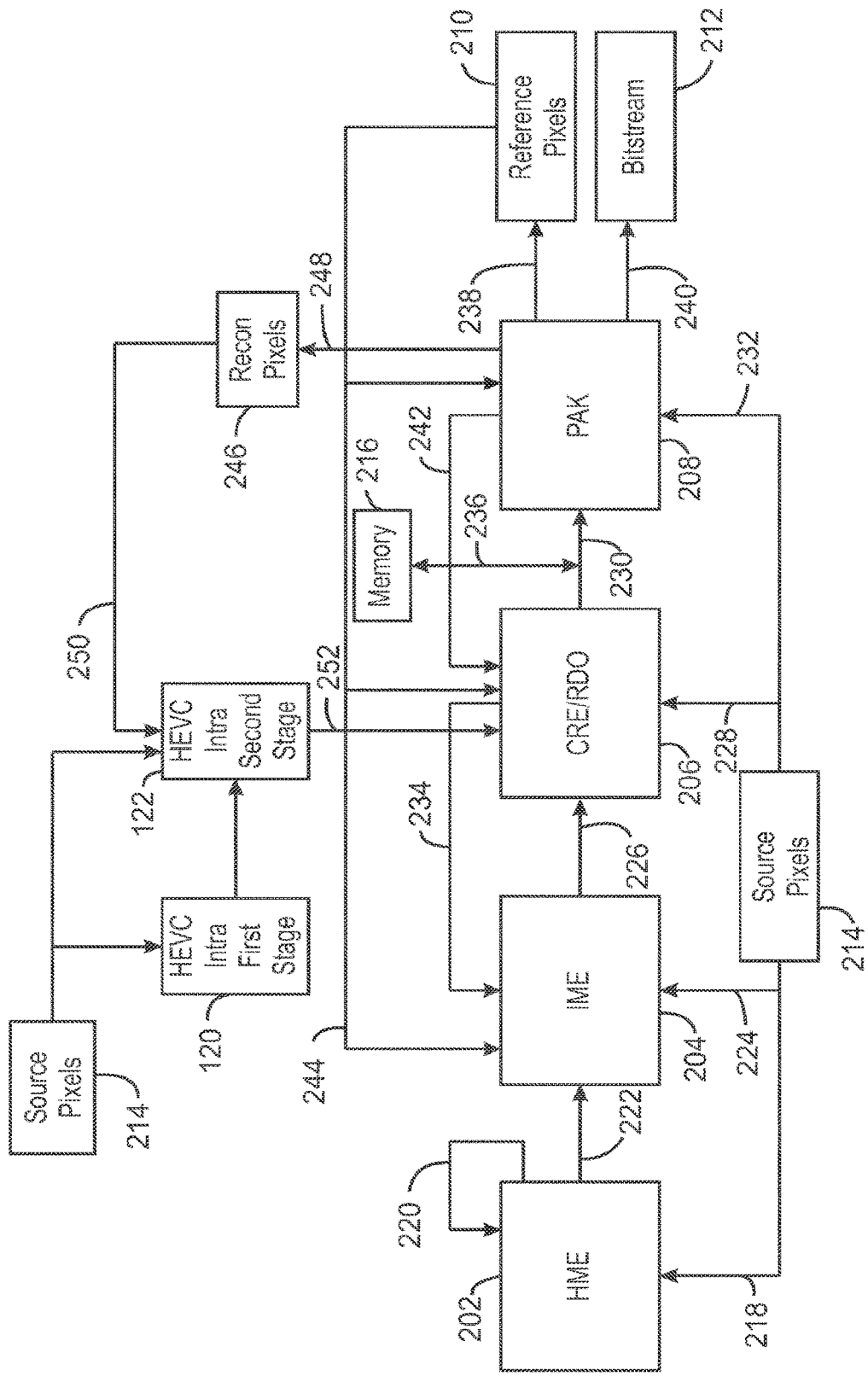
FIG. 2 is a block diagram illustrating an example pipeline for encoding video using a two-stage intra search.

FIG. 2 is a block diagram illustrating an example pipeline for hardware video encoding using a two-stage intra search. The example pipeline 200 can be implemented in the system 100 of FIG. 1 above, or the electronic device 700 below in FIG. 7 using the methods 400-600 of FIGS. 4-6 below. The pipeline 200 includes multiple stages including a hierarchical motion estimation (HME) search stage 202, an integer motion estimation (IME) search stage 204, a check and refinement engine (CRE)/rate distortion optimization (RDO) stage 206, and a hardware bit packing (PAK) stage 208. For example, the HME search stage 202 may be implemented via the video encoder AVC VDENC 110, the IME search stage 204 may be implemented via the HEVC IME 116, the CRE/RDO stage 206 may be implemented via the HEVC CRE 118, and the PAK stage 208 may be implemented via the HEVC/VP9 PAK 112 of FIG. 1 above. The output of the PAK stage 208 may be reference pixels 210 and a bit stream 212. In addition, FIG. 2 includes a set of source pixels 214 shown being received at the HME 202, the IME 204, the CRE/RDO 206, the PAK 208 The pipeline 200 includes memory 216 communicatively coupled to the CRE/RDO 206. The pipeline 200 includes also includes an HEVC Intra First Stage 120 communicatively coupled to the IME 104. The pipeline 200 also includes an HEVC Intra First Stage 122 communicatively coupled to the CRE/RDO 206 and the PAK 208.

A hierarchical motion estimation (HME) search 202 may be performed to obtain multiple references. In various examples, the HME 202 may be performed on each subsequent frame in order to determine the motion vectors for each frame. An HME search 202 involves performing coarse searches for motion vectors for each frame to determine an estimated motion vector for each CU within the frame based on a previous frame. For example, when a first I-frame is analyzed, no HME search may be performed as there is no previous frame. At that time, the source pixels 214 may be downscaled so that way when the next frame is encoded, the downsampled pixels 220 may become the reference that is compared to the source 216 for motion estimation. The reference 220 may thus be used from the third frame onward. Thus, the source pixels 216 may be internally downsampled by the HME 202 and written and read back as indicted by feedback loop 220 for future use as a downsampled reference. The initial estimated motion vectors may be refined by performing additional searches at a finer level of granularity. For example, the CUs may be searched at various resolutions, from coarse to fine levels of granularity, in order to determine the motion vectors. Other HME searching techniques may include, but are not limited to, changing the size of the CUs when searching for motion vectors.

In various examples, bit rate control may be applied to each frame in order to create frames that meet the frame size of the encoding format of the target video stream. For example, the various video compression formats use a stated bit rate for a video stream, and the bit rate is the number of bits per second that are present when the video is played. In some examples, bit rate control may be performed by determining the ideal quantization parameters for the frame to result in the target frame size.

In some examples, the HME search stage 202 may take as input a full resolution CU and scale down the resolution to a fourth, an eighth, or higher resolution. The HME motion estimation can then be performed with the scaled down resolution. For example, the full resolution of the input CUs may be 64×64 pixels, and the scaled down resolutions may be 32×32, 16×16, and 8×8 pixels. This results in a performance advantage when compared to performing the HME search 202 at full resolution, which may be very power performance intensive. In some examples, the HME search 202 can be performed using two references. For example, the two references may be the two frames that immediately precede a current frame. In other embodiments, the two references may be a previous frame and a long term reference frame. As used herein, a long term reference frame is a high quality encoded frame that was processed within a predetermined number of frames ago. For example, the long term reference may be a very good quality encoded frame from 100 frames ago. In some examples, a predetermined number of candidates may be considered for motion estimation. For example, the number of candidates may be set at sixteen candidates. In some examples, the HME search 202 may include two stages. For example, the first HME stage may be more downscaled than the second HME stage. The second HME stage may receive predictors from the first HME stage. In this way, the number of stages may be increased to reduce lost details due to larger downscaling using less stages. The output of the HME search 202 may be HME predictors 222. For example, the HME predictors 222 may be a pair of reduced precision motion vectors. The HME predictors 222 may be good guesses on where to search for a match, as analyzed from downsampled source pixels 216.

The integer motion estimator (IME) 204 may perform a full search using the HME predictors 222, source pixels 224, and reference pixels 244 from the PAK 208. For example, the IME 204 can use a reduced precision motion vector found during the dual HME search 202 to obtain a precise motion vector. The IME 204 can compare all values of various block sizes for the coding units of the current frame recited from source pixels 214 with that of integer pixels in a search area of a reference image frame from reference pixels 244.

In some examples, the IME 204 may use up to 12 40×40 search windows or predictors. For example, the IME 204 may use four predictors, or any other number of predictors based on a performance mode. For example, a higher performance mode may select two spatial neighbors and two HME predictors, while a normal performance mode may be able to include four or more additional predictor candidates.

The check and refinement engine (CRE) 206 may partition the CU into pixel coding units using nested loops. For example, the partitioning may be based on a CU record 226 received from the IME 204. A CU record is an enumeration of every single shape within a CU, such as a 16×16 CU. Furthermore, some CU may be split into multiple Prediction Units (PUs) or Transform Units (TUs) that are more fine-grained within a CU. Various coding standards have multiple block sizes that could be selected such as 16×16, 8×8, 4×4s and so on. During the IME searches 204, some of the candidates found in the first full search can be combined with other candidates from the second full search. The CU record keeps track of the CU shapes and depending on the motion vectors found, some CUs can be combined via partitioning. The CRE 206 may use the MB record when determining combinations of integer motion estimation to use for generating residuals to be transformed and scored for comparison. As used herein, a residual refers to a difference between a predicted value and the value of a pixel from the source buffer or a reconstructed pixel from the PAK.

As indicated by a feedback loop from the CRE 206 to the IME 204, the CRE 206 may provide neighbor predictors 234 to the IME 204. The neighbor predictors 234 may be good guesses where to search for a match given what a preceding neighbor found as a good match. For example, the neighbor predictors 234 may include cost centers and search centers. For example, the cost centers may be based on advanced motion vector prediction (AMVP) and a merge list within the codec. The cost centers may represent the closest matching location to what the decoder would predict in a current block's motion vector by some combination of previously decoded neighbor motion vectors because a motion vector for the current block 228 may be coded differentially to the predicted motion vector. For example, if a predicted motion vector is (10,−5), then (10,−5) may be marked as the center of the search for a motion vector that has the best match and is close to that center. If, for example, (11,−5) is the best match, then the encoder can send (1,0) in the bit stream for the decoder to add to the predicted vector of (10,−5) to result at the correct location (11,−5).

The CRE 206 sends mode decisions to the PAK 208 as indicated by an arrow 230. In some examples, the mode decisions can be stored in memory 216 as indicated by another arrow 236.

The PAK stage 208 is to pack bits corresponding to the source pixels 232 as coded according to the mode decision into a data format. In some examples, the data is formatted according to a recursive video standard. Recursive video standards may include, but are not limited to, HEVC, VP9, etc. In various examples, the results are binarized into the different video formats based on the encoder mode selection received from the CRE 206. As shown by arrows 238 and 240, the results of the PAK stage 208 may include reference pixels 210 and a bit stream 212, which can be accurately and uniquely decoded by following the video standard. The encoder mode selection may yield a plurality of mode decisions. A mode decision, as used herein, refers to how the encoder represents each CU. The encoder mode selection may be set to encode the least number of bits with the highest amount of quality. In some examples, the PAK 208 may be set to encode at a 64×64 granularity. For example, in the case that a 64×64 block may be represented by a single bit, then a 64×64 granularity would be more efficient than a 32×32 granularity, which would require at least four bits. In some examples, the PAK 208 may be set to encode at a 32×32 granularity. On the other hand, the PAK 208 can be set to operate at a 32×32 granularity to lower the time it takes for statistics to be generated by the PAK 208. In some examples, as shown by feedback loop 242, such statistics may be sent from the PAK 208 to the CRE 206 and used to improve prediction at the CRE 206. For example, the statistics may be used for a slice size conformance feature to predict when a current slice is to be closed and another slice started to align slice sizes to network packets. In some examples, the PAK 208 may have an accurate bit stream size counter, while the rest of system 200 may use an approximate bit stream counter. Getting the feedback four times per 64×64 CU versus one time per 64×64 CU may enable more accurate slice size termination. In some examples, the reference pixels 210 may also be provided to the IME stage 204 as indicated by a feedback loop 244. For example, the IME stage 204 may compare a subsequent frame to the reference pixels 210 to find an appropriate block in the reference pixels 210. Thus, the reference pixels 210 may be used by the IME stage 204 to perform motion estimation as described herein.

In some examples, the IME search 204 is decoupled in the pipeline 200 to run one 32×32 block ahead of the RDE loop which performs the Merge, Inter (FME) and Intra check. Although an intra search may be performed later in the pipeline, it is being split into two separate stages to enable an intra reconstruction feedback. The two stages include an open-loop intra search referred to as the HEVC intra first stage 120 followed by an accurate intra prediction and reconstruction, referred as the HEVC intra second stage 122. The open loop Intra search of the HEVC intra first stage 120 is completely based on source pixels, allowing the HEVC intra first stage 120 to run earlier in the pipeline 200 with some loss in accuracy. In some examples, to compensate for this loss in accuracy, multiple candidates identified as the best options during open loop search may be sent through an accurate rate distortion estimation (RDE) pipeline for each intra CU size. For example, the three best open loop modes out of 35 may be selected for a full accuracy intra RDO.

In various examples, the intra RDE logic may have an enhanced intra TU decision logic that uses reconstructed pixels at every TU boundary. In some examples, an intra 4×4 performance optimization may also be included. For example, the 4×4 performance optimization may be achieved by disabling left angles for 4×4_1 (top right) and top angles for 4×4_2 (bottom left) within a 8×8 block and still support PU4×4 prediction for CU8×8. This 4×4 performance optimization may enable either faster performance or higher quality and lower performance. In some examples, the pipeline 200 may also include an intra candidate sequencing in the RDE pipeline with CU sizes and TU depths to reduce the latency due to reconstructed pixel dependency. In various examples, reconstructed pixels may always generated at TU boundaries, but with carefully selected dependency restrictions. For example, the dependency restrictions may depend on which performance versus quality mode of the pipeline 200. As one example, a second 8×8 TU block of a 16×16 CU may wait until a first 8×8 TU block has prepared its final reconstructed pixels if the second 8×8 TU block is using horizontal prediction, but not if the second 8×8 TU block is using vertical prediction. Thus, in various examples, some blocks may have different subsets of angles available to accelerate concurrent processing. In some examples, in higher quality modes this dependency restriction may not be set. In these examples, all blocks may wait for their neighbors to finish before processing, and all angles are allowed to be selected to improve prediction accuracy.

In various examples, to reduce latency of the TU 4×4 pipeline, a dedicated transform unit (not shown) may be included in the pipeline 200 to cut down the feedback path delay. For example, the dedicated transform unit may include forward and reverse transforms. In some examples, intra angles support for PU4×4 may be restricted based on a block index to ensure some of the blocks can go back to back improving the overall 4×4 check performance. For example, the block index may be a sequential z pattern of index numbers: 0, 1, 2, 3 that are numbered left to right and top to bottom. In some examples, the number of 4×4 TU's in RDE within a larger LCU may be capped to ensure critical performance timelines are met. For example, in some cases, further downstream units such as the PAK 208 may experience performance issues with too many 4×4 TUs. Therefore, heuristics may be included in the pipeline 200 to ensure that only a limited number of 4×4s are checked for every 32×32 block. In this way, the HEVC VDENC pipeline 200 will always be within the allotted time budget for a respective mode.

In various examples, intra candidate sequencing can be interleaved across the identified PU candidates from the HEVC intra first stage 120 as well as within a CU. For example, the HEVC intra second stage 122 interleave smaller TUs to most efficiently use hardware compute to hide feedback delays, as reconstruction may be performed at each TU boundary for maximum quality, but this reconstruction may also introduce significant latency.

In various examples, the PAK 208 may provide reconstructed pixels 246 as shown by arrow 248 to the HEVC intra second stage 122, as shown by an arrow 250. For example, a feedback from PAK 208 of non-filtered reconstructed pixels may be included in the system 200. In various examples, the HEVC intra second stage 122 also receive the source pixels 214. For example, all intra stages may receive source pixels for the interior. Edge pixels would be either original source pixels, fully reconstructed pixels, or some combination of the two. For example, the left edge could be original while top edge could be reconstructed. But, in either case, the interior pixels are the source block being encoded. The HEVC intra second stage 122 can also generate block vector candidates based on the reconstructed pixels 246, the source pixels 214, or both, as indicated by an arrow 252. The HEVC intra second stage 120 can generate block vector candidates based on the source pixels 214 and send the block vector candidates to the IME stage 204 to be included in the IME search described above, as indicated by an arrow 254. The candidates may be the block vector candidates that have the lowest prediction error between the source pixels 214 and the reconstructed pixels 246. For example, the HEVC intra second stage 120 can generate the block vector candidates using the method 500 of FIG. 5.

In some examples, the PAK 208 may also perform PAK only multi-pass without performing motion estimation and mode decision for small frame QP changes. For example, if multiple passes are needed to achieve a desired frame size by the bit rate control (BRC) algorithm, two options may be presented for a second pass. In the first option, the PAK 208 can redo the entire encoding based on the updated costings with the new QP. In the second option, the PAK 208 can bypass the encoding and replay the mode decisions from the first pass with a modified QP only using the PAK 208 hardware. For example, the PAK 208 may retrieve mode decisions saved to memory 216 as indicated by an arrow 236. The second option may save both power and time. In some examples, the first or second option may be selected based on a threshold level of frame QP changes. For example, the PAK may perform a PAK only multi-pass in response to detecting a frame QP change that is less than a first threshold and higher than a second threshold. Thus, the HME 202, IME 204, and CRE 206 may be bypassed and computing resources can be saved to increase precision by small amounts.

The diagram of FIG. 2 is not intended to indicate that the example pipeline 200 is to include all of the components shown in FIG. 2. Rather, the example pipeline 200 can be implemented using fewer or additional components not illustrated in FIG. 2 (e.g., additional stages, feedback loops, etc.).

Figure 3:
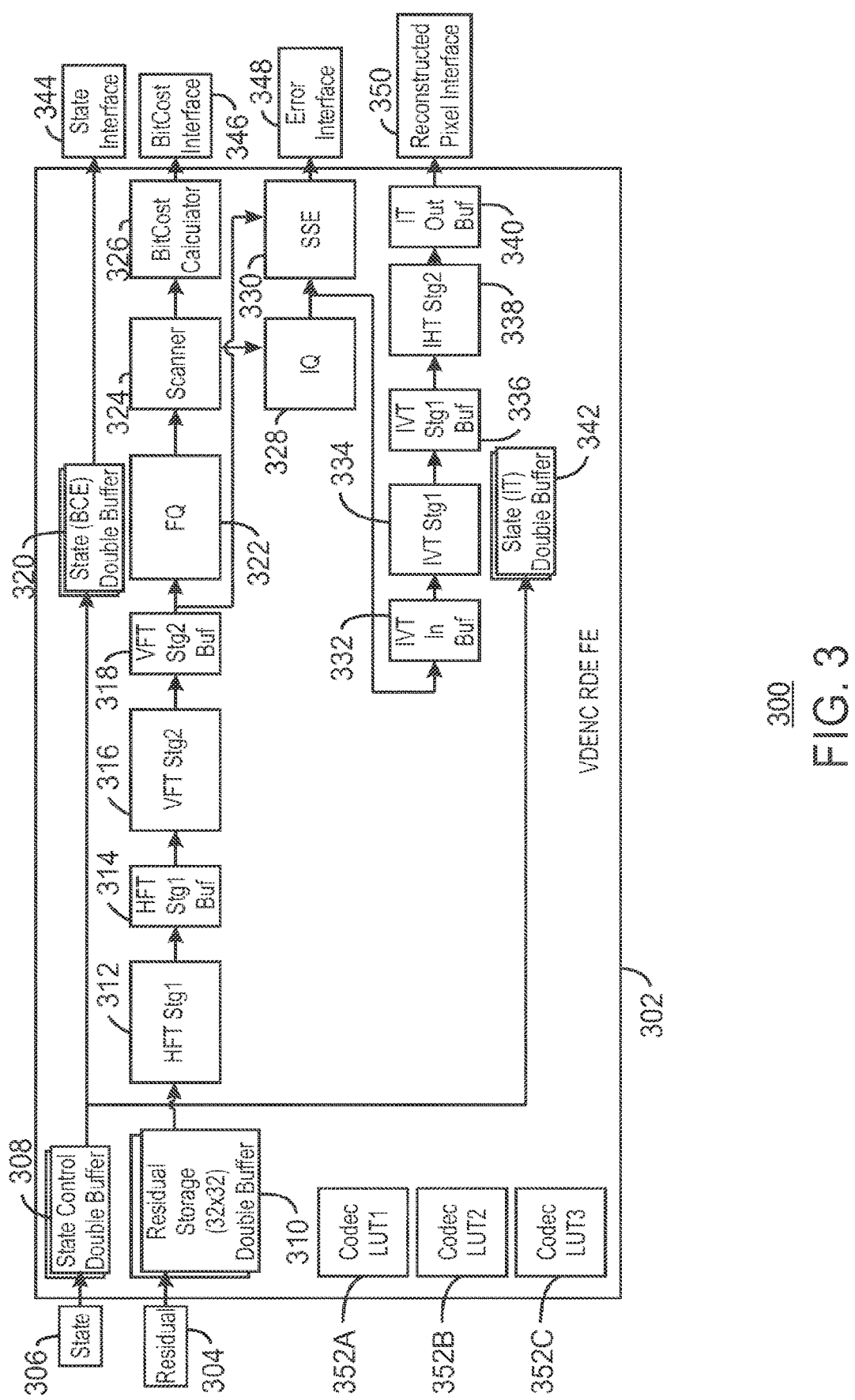
FIG. 3 is a block diagram illustrating an example system for encoding video using a unified multi-codec rate distortion estimation.

FIG. 3 is a block diagram illustrating an example system for encoding video using a unified multi-codec rate distortion estimation. The example system 300 can be implemented in the electronic device 700 of FIG. 7 below. For example, the system 100 may be implemented using the encoder 728 and microcontroller 752 of the electronic device 700.

The system 300 of FIG. 3 includes a VDENC Rate Distortion Estimation (RDE) Front-End (FE) 302, shown receiving a residual 304 and a state 306. The VDENC RDE FE 302 includes a state control double buffer 308 to receive the state 306. The VDENC RDE FE 302 also includes a residual storage double buffer 310 to receive and store the residual 304. The VDENC RDE FE 302 also includes a first stage Horizontal Forward transform (HFT Stg 1) 312 communicatively coupled to the residual storage double buffer 310. The VDENC RDE FE 302 also includes a FT Stg 1 Buffer 314 to receive and temporarily store transformed residuals from the HFT Stg 1 312. The VDENC RDE FE 302 also includes a Second Stage Vertical Forward Transform (VFT Stg2) 316 communicatively coupled to the HFT Stg 1 Buffer 314. The VDENC RDE FE 302 also includes a VFT Stg 2 Buffer 318 communicatively coupled to the VFT Stg 2 316. The VDENC RDE FE 302 also includes a state (BCE) double buffer 320 communicatively coupled to the state control double buffer 308. The VDENC RDE FE 302 further includes a forward quantization (FQ) 322 communicatively coupled to the VFT Stg 2 Buffer 318. The VDENC RDE FE 302 also includes a scanner 324 communicatively coupled to FQ 322. The VDENC RDE FE 302 also includes a BitCost calculator 326 and an Inverse Quantization (IQ) 328 communicatively coupled to the scanner 324. The VDENC RDE FE 302 includes a sum of square error (SSE) calculator 330 communicatively coupled to the IQ 328. The VDENC RDE FE 302 includes an inverse vertical transform (IVT) In buffer 332 communicatively coupled to the SSE calculator 330. The VDENC RDE FE 302 further includes an IVT first stage (Stg1) 334 communicatively coupled to the IVT In buffer 332. The VDENC RDE FE 302 also includes an IVT Stg1 buffer 336 communicatively coupled to the IVT Stg1 334. The VDENC RDE FE 302 also includes an inverse horizontal transform (IHT) second stage (Stg2) 338 communicatively coupled to the IVT Stg1 buffer 336. The VDENC RDE FE 302 also further includes an IT out buffer 340 communicatively coupled to the IHT Stg2 338. The VDENC RDE FE 302 also includes a state (IT) double buffer 342 communicatively coupled to the state control double buffer 308. The system 300 further includes a state interface 344, a BitCost interface 346, an error interface 348, and a reconstructed pixel interface 350. The system 300 also further includes a number of codec lookup tables (LUTs), including codec LUT1 352A, codec LUT2 352B, and codec LUT3 352C. For example, the codec LUT1 352A, codec LUT2 352B, and codec LUT3 352C may each include syntax structure and transform coefficients for a particular codec.

In the example system 300, the VDENC RDE FE 302 receives a residual 304 and a stage 306 and computes an RDE cost for one or more candidates for every CU and processes all CU sizes that the HEVC spec supports. For example, the CU sizes may include 64×64, 32×32, 16×16 and 8×8. In various examples, the VDENC RDE FE 302 includes multiple sub-pipes. For example, the VDENC RDE FE 302 includes a Forward Transform (FT) Pipe, including HFT Stg1 312, HFT Stg 1 Buffer 314, the VFT Stg 2 316, and the VFT Stg 2 Buffer 318. The VDENC RDE FE 302 also includes an Inverse Transform (IT) Pipe. The IT Pipe includes an inverse vertical transform (IVT) In buffer 332, the IVT Stg1 334, the IVT Stg1 buffer 336, the IHT Stg2 338, the IT out buffer 340, and the state (IT) double buffer 342. The VDENC RDE FE 302 further includes a BitCost Estimation (BCE) Pipe. The BCE Pipe includes the state (BCE) double buffer 320, the FQ 322, the scanner 324, and the BitCost calculator 326. The VDENC RDE FE 302 also further includes an Error Estimation (EE) Pipe. The EE Pipe includes the IQ 328 and the SSE calculator 330. The VDENC RDE FE 302 includes a state interface 344, a BitCost interface 346, an error interface 348, and reconstructed pixels 350.

Still referring to FIG. 3, RDE FE (302) receives residual data 304 for each of the one or more candidates for every CU. For example, the residual data 304 may be the difference between the original pixels and the reference pixels, or original_pixel—reference_pixel. The RDE FE (302) also receives corresponding state data 306 that indicates CU parameters such as size, transform depth, intra modes, inter motion vectors (MVs), etc. In various examples, in order to maintain the hardware pipeline throughput, both the state 306 and residual 304 data inputs are stored in double-buffers inside the RDE FE such that one buffer continues to accept data for the next CU candidate when the current one is being processed from the other buffer. For example, the state control double buffer 308 may store state data 306 and the residual storage double buffer 310 may store residual data 304.

In various examples, the residual data 304 from the residual buffer 310 is fed into the two stage Forward Transform (FT) pipe consisting of the HFT Stg1 312 and HFT staging buffer 314 to temporarily receive and store intermediate transformed residuals from HFT Stg1 312. The second stage consists of the VFT Stg2 316 and the VFT staging buffer 318. The two stage FT pipe along with the corresponding buffers 314 and 318 may be customized to support variable throughput based on the transform size. For example, the two stage FT pipe may be implemented such that multipliers are re-used and only the constants are selected differently based on the transform sizes. In various examples, the storage structure is configured to facilitate access to the intermediate transformed residual data to be different based on transform sizes.

In various examples, the data from the VFT staging buffer (318) is fed to the FQ 322 of the BitCost estimation pipe and also to the SSE 330 of the Error Estimation pipe. The state data 306 from input state buffer 308 is also fed to the state (BCE) double buffer 320 in the BCE pipe and the state (IT) double buffer 342 in the IT pipe. In various examples, the state data 306 is synchronized with the coefficient and residual data 304 that is processed in the sub-pipes. The residual is the delta between the source block and the prediction. The delta may represent the error or misprediction between the source block and the prediction. The residual is sent into the forward transform, which converts the spatial domain pixel residual into a frequency domain. For example, the frequency domain may be represented by alternating current (AC)\direct current (DC) coefficient magnitudes. In various examples, these magnitudes may then be reduced by a forward quantization at the FQ 322. The IQ 328 of the IT pipeline may then regenerate the residual in the spatial domain, although loss may occur as the quantization step is a lossy process. The residuals and coefficients are thus linked through the FT\IT process.

In some examples, the FQ 322 in the BCE pipe includes any number of quantizers running in parallel to maintain the pixel throughput for the fastest transform size. For example, the fastest transform size may be transform T8×8 and T4×4. This output is fed to a customized scanner 324 that is used to identify the number of non-zero coefficients (NZC) per 4×4 block basis. This identification of the number of non-coefficients per 4×4 block may be implemented in order to maintain the throughput of 16 pixels per clock that is equivalent to the other sub-pipes for the smaller transforms, including T8×8 and T4×4. The scan output from scanner 324 is fed to the BitCost calculator 326 that accumulates the cost for every non-zero coefficient based on the value of the coefficient itself and also adds additional cost for the number of zero coefficients within a 4×4 block. The output of the BitCost calculator 326 is fed to the BitCost interface 346 of the RDE FE 300.

In various examples, the IQ 328 in the EE pipe performs an inverse quantization on the FQ Coefficients from the FQ 322 that are sent through the Scanner 324. The IQ 328 output is fed to both the SSE 330 and also to the input buffer 332 of the IT Pipe. The SSE 330 computes the error introduced during quantization by computing the sum of square error of the coefficients pre quantization output from VFT Stg2 Buffer 318 and the post quantization output from the IQ 328. The output of the SSE 330 is fed to the Error interface 348 of the RDE FE 300.

The IT pipe is a two stage transform pipe that includes the IVT stage1 334 and IHT stage2 338. The output of the IVT Stg1 334 is stored in the intermediate transform coefficient buffer IVT stg1 buffer 336. In various examples, the IHT Stg2 338 is customized to only accumulate the right boundary and bottom boundary reconstructed pixels for every CU, since only those reconstructed pixels in the CU are used by subsequent neighboring CUs for reference pixel generation. In some examples, the output of the IHT Stg3 338 is fed to the IT output buffer 340 that is optimized to only store the right and bottom boundary pixels. The output of the IT pipe buffer 340 is red to the Reconstructed Pixel interface 350 of the RDE FE 300.

The state data from the BCE pipe block 320 is communicatively coupled to the state interface 344 of the RDE FE 302. In various examples, this state data is synchronized with the BitCost data from BCE pipe received at the BitCost interface 346, and the Error data received from EE pipe at the error interface 348.

Thus, the DCT compute logic may be shared across codecs with just variation in the coefficients constants matrix to support multiple codecs such as AVC and HEVC. In particular, the expensive multiplication units may be shared across multiple codecs using a coefficient constant lookup table (not shown). For example, a general purpose matrix multiplication may be used, where the codec specific transform coefficients can be modulated to better optimize per codec.

In some examples, a variable transform throughput logic using the same set of multipliers for horizontal transform (HT) and vertical transform and (VT) may be used so that smaller TUs get a higher speedup. For example, a 32×32 TU may run at 4 pixels per clock (PPC), a 16×16 TU may run at 8 PPC, an 8×8 TU may run at 16 PPC, and a 4×4 TU may run at 32 PPC.

Certain logic may be less codec specific and can be more easily be shared. Such logic may include quantizers and scale matrix elements located inside the Forward Quantizer FQ 322 and Inverse Quantizer IQ 328. In some examples, the shared scaling matrix may be implemented as read-only memory (ROM) tables and different matrix values may be selected based on the codec. For example, these matrix values may be used in the multiplier elements of FQ 322 and IQ 328. Thus, this logic may be shared in the VDENC RDE FE 302. However, some codec specific syntax and coefficient bit-cost estimators, such as the BitCost Calculator 326 in FIG. 3, may have differences in their lookup tables and may offer increased quality through more accurate rate estimation. Therefore, in various examples, these elements may remain separate in the VDENC RDE FE 302.

FIG. 3 shows the stages of the unified RDE logic, where common compute elements are shared across codecs through the use of codec specific look-up tables for various constants. For example, in FIG. 3, four transform sizes are supported by the HFT Stg1 312, HVT Stg2 316, IVT Stg1 334 and IHT Stg2 338. The four transform sizes include 32×32, 16×16, 8×8, and 4×4 transform sizes. For each of the transform sizes, the constants may be different based on the codec. For example, the codec may be implemented in hardware in HFT Stg1 312 and VFT Stg2 318 as in various codec LUTs 352A-352C, but the multiplier elements themselves may be shared across all codecs. Another example of common compute elements is the SSE 330. For example, the Sum Square Error is computed in the frequency domain for HEVC and in the pixel domain for AVC. However, in both cases, the compute elements used are shared. For example, the compute elements may include adders and multipliers.

The diagram of FIG. 3 is not intended to indicate that the example system 300 is to include all of the components shown in FIG. 3. Rather, the example system 300 can be implemented using fewer or additional components not illustrated in FIG. 3 (e.g., additional stages, buffers, etc.).

Figure 4:
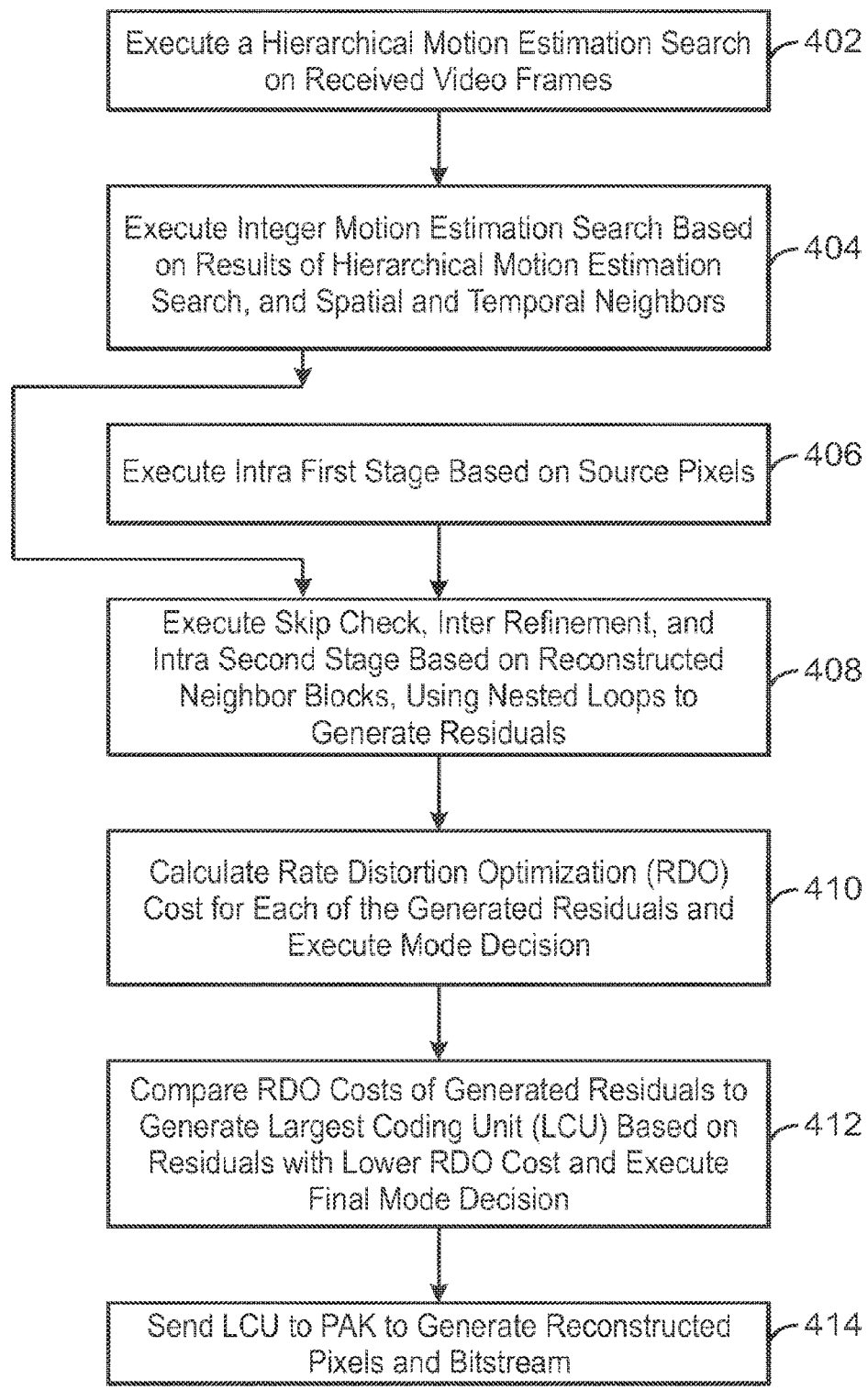
FIG. 4 is a process flow diagram of an example method for encoding video using a two-stage intra search.

FIG. 4 is a process flow diagram of an example method for encoding video using a two-stage intra search. The method 400 can be implemented in the system 100 or pipeline 200 or the electronic device 700.

At block 402, a hierarchical motion estimation search is performed on two received video frames. In some examples, the hierarchal motion estimation search is performed using downscaled references. For example, each largest coding unit (LCU) (64×64) of each video frame can be downscaled to 8×8 blocks and searched at $\frac{1}{8}^{th}$ resolution. Results may then be provided to $\frac{1}{4}^{th}$ resolution search stage. Finally, a list of candidates may be generated for a 1× resolution IME for each 32×32 CU of the 64×64 LCU. This may be done as 64×64 to ensure the 8× downsampled 8×8 is large enough to have enough features to track small to medium sized objects, as opposed to using 32×32 downscaled by 8× and searching for 4×4 matches. The list of 1×IME candidates may include spatial neighbors, HME derived predictors, temporal predictors, and user-provided predictors. In some examples, the number of predictors used by the IME may be based on a performance mode. For example, in a high performance mode, the IME may choose 12 predictors from a set of predictors. In a lower performance mode, the IME may use only four predictors. In some examples, the predictors may be sorted based on a predefined ranking list that assigns each predictor a priority number. For example, higher priority predictors may be selected based on priority number if a subset of predictors is used. In some examples, redundant predictors may be detected using a search center distance parameter that may be used to analyze overlap between predictors. If a predictor is redundant with respect to a predictor that was already used for a search, then the redundant predictor may be dropped and a predictor with a next higher priority number may be used. In some examples, the amount of overlap used to determine redundancy may be a programmable threshold.

At block 404, an integer motion estimation (IME) search is executed based on the results of the hierarchical motion estimation search, and spatial and temporal neighbors. The search may be performed to identify a candidate that will win. In some examples, the search may also be for a predictor for which further search will be done to find the final candidate. In some examples, the IME search may include the use of spatial and temporal neighbor predictors. The result of the 32×32 IME may be a list of 49 square and rectangle shapes subdividing the 32×32 into various coding unit (CU) and prediction unit (PU) combinations. In various examples, these results may undergo fractional and bidirectional improvements.

At block 406, an intra first stage is executed based on source pixels. For example, intra first stage is executed based on source pixels of neighboring blocks. In various examples, the process of intra prediction has a strong dependency to the immediate neighbor blocks. Specifically, intra prediction may depend on the pixels a decoder generates, as those are the pixels used to decode a current block. In some examples, intra search of a current block includes performing intra prediction for a number of different angular and non-angular modes based on the neighbor reconstructed pixels. During encoding, reconstructed neighbor pixels may not be known until a final mode decision occurs, which introduces a short feedback loop which constrains the performance of the encoder. The process of reducing the number of angular and non-angular intra prediction to a smaller subset can be done with reasonable accuracy by substituting the reconstructed neighbor pixels with the source pixels of the neighboring block in a first stage intra search. This smaller list of candidate intra modes can then be prepared in advance of the short feedback loop stage based on the neighbor reconstructed pixels allowing it to focus on candidates that are more likely to be a good final selection within a limited time budget in the second stage intra search within the RDO feedback loop. In various examples, if a time constraint is relaxed, more candidates can be considered in the second stage at block 408, up to and including all of the candidates considered in the first stage. Additionally, because the intra first stage is a heuristic to derive candidates, the intra first stage may have different angular and non-angular intra prediction logic equations than the intra second stage. Therefore, in some examples, the intra first stage can be performed with a superset of the angles in one codec standard and then the intra second stage can use the subset of the angles that are applicable to the codec standard the current source block is being compressed to.

At block 408, an intra second stage is executed based on based on reconstructed neighbor blocks to generate residuals. A check and refinement may also be executed using nested loops to generate residuals. For example, the residuals may be generated based on at least one spatial domain prediction and at least one frequency domain prediction. The CRE nested loop can process CUs in a bottom-up fashion resolving each 8×8 first then comparing 4×8×8 vs 1×16×16, then 4×16×16 vs 1×32×32, lastly 4×32×32 vs 1×64×64, as described in greater detail with respect to FIG. 3 above. In some examples, each of the nested loops can be a CU tree of multiple depths up to the level described and the levels beneath. For example, if the 4×8×8 has a lower RDO cost than the 1×16×16, then that 4×8×8 would be considered as the 1×16×16 for larger comparisons with 4×16×16 groupings. In some examples, merge tapering may be used for additional candidate generation. For example, while executing the skip (merge) processing of a given CU level, partial results can be saved and re-used as lower level CU inter candidates. The lower level CU inter candidates may then be AMVP coded rather than merge coded. In some examples, LCU based neighbor reconstruction may be used for improved performance. For example, top row and left LCU edge pixels can be reconstructed and fed back from PAK to provide more accurate intra prediction without substantially affecting hardware complexity due to the 32×32 Z-pattern walk within a 64×64 LCU.

At block 410, a rate distortion optimization (RDO) cost is calculated for each of the generated residuals and a mode decision is executed. For example, the mode decision may be executed for transform unit sizes up to a size of a coding unit. For example, each of the generated residuals may be transformed into the frequency domain via a discrete cosine transformation and then quantized.

In some examples, the CRE can make per CU QP adjustments based on motion length. For example, motion can be classified as static, low motion and high motion. In some examples, an additional motion length stage can be included to provide an additional delta QP adjustment. For example, the human visual system may more sensitive to artifacts on static objects than objects with high motion. Thus, the QP can be decreased and increased in the PAK MB object to blur details and enhance them, respectively. In this manner, additional bits can be saved in areas where the human visual system may be less sensitive.

At block 412, the RDO costs of the generated residuals may be compared to generate a largest coding unit (LCU) based on residuals with a lower RDO cost and a final mode decision is executed. For example, while the IME and CRE may use Sum of Absolute Transform Distortion (SATD) for the decision criteria, a final mode decision may be based on RDO estimated sum of square errors (SSE) of the reconstructed block (distortion) along with the estimated bit cost based on the number of non-zero coefficients, their magnitudes, and their frequencies. The generated LCU may then be sent to the PAK to be used to encode a 32×32 or 64×64 portion of a video frame at the PAK based on the generated LCU.

At block 414, the LCU is sent to a PAK to generate reconstructed pixels and a bit stream. The LCU may correspond to a portion of an image to be reconstructed and stored locally. The reconstructed image can used by the IME during encoding of the next frame. For example, the IME can perform motion estimation on the reconstructed pixels. The bit stream can be sent to a display device.

This process flow diagram is not intended to indicate that the blocks of the example method 400 are to be executed in any particular order, or that all of the blocks are to be included in every case. Further, any number of additional blocks not shown may be included within the example method 400, depending on the details of the specific implementation.

Figure 5:
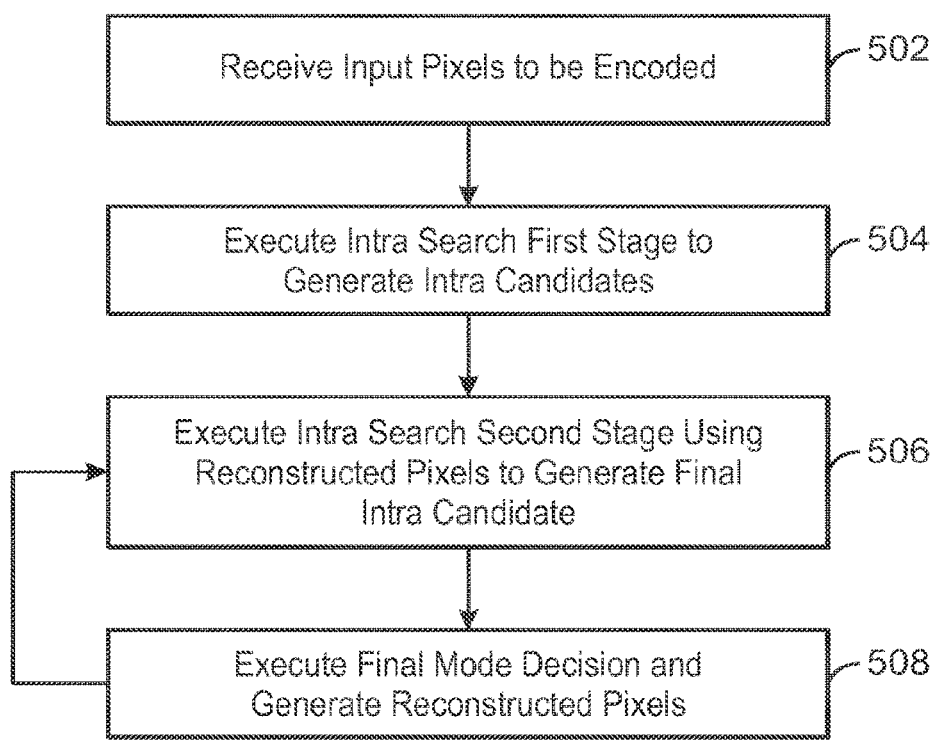
FIG. 5 is a process flow diagram illustrating an example method for performing a two stage intra search stage.

FIG. 5 is a process flow diagram of an example method for performing a two stage intra search. The method 500 can be implemented in the system 100 above or the electronic device 700 below.

At block 502, input pixels to be encoded are received. For example, the input pixels may be of a frame of video.

At block 504, an intra search first stage is executed to generate intra candidates. In some examples, source pixels from a neighboring block may be used. In various examples, a prediction type of a different codec than used in executing the intra search second stage may be used.

At block 506, reconstructed pixels are received. For example, the reconstructed pixels may be associated with the intra candidates and received from rate distortion estimation unit.

At block 508, an intra search second stage is executed using the reconstructed pixels to generate a final intra candidate. In some examples, partially reconstructed pixels of a neighboring block or fully reconstructed pixels of the neighboring blocks may be used. The final intra candidate may be selected using a more fine grained analysis. For example, where the intra search first stage is trying to identify which angular prediction has the least error, the intra search first stage may not capture the coding cost (syntax overhead) of that angle or the actual neighbor pixels used by the decoder. The intra search second stage may thus address both of these by using accurate neighbor pixels and estimating the coding cost more close to the real cost including the quantized coefficient coding cost.

This process flow diagram is not intended to indicate that the blocks of the example method 500 are to be executed in any particular order, or that all of the blocks are to be included in every case. Further, any number of additional blocks not shown may be included within the example method 500, depending on the details of the specific implementation. For example, the method 500 may include limiting a number of 4×4 blocks to be searched in the intra search first stage or the intra search second stage. In some examples, the method 500 may include restricting intra angle support for 4×4 prediction units based on a block index. In various examples, the method 500 may also include interleaving intra candidate sequencing across prediction unit candidates identified in the intra search first stage and prediction unit candidates within a coding unit to interleave smaller transform units.

Figure 6:
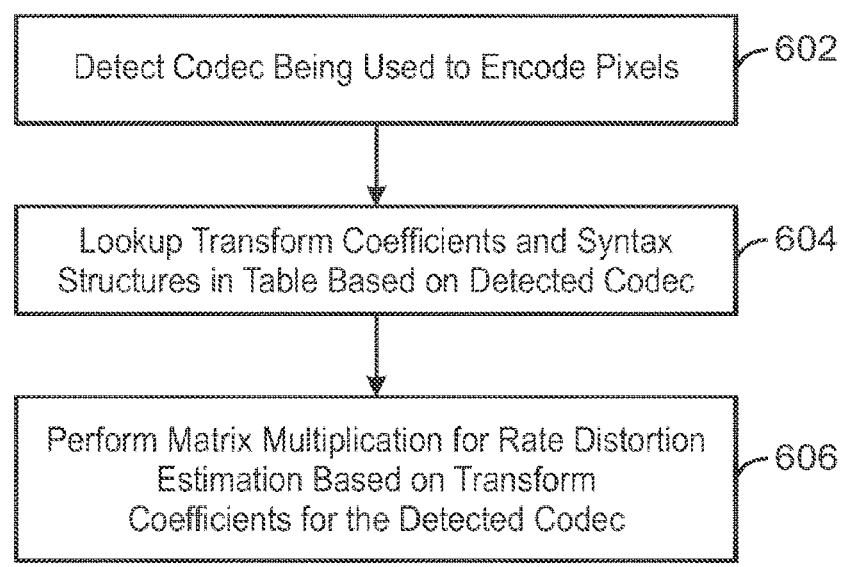
FIG. 6 is a process flow diagram of an example method for performing a matrix multiplication using a unified rate distortion estimation.

FIG. 6 is a process flow diagram of an example method for performing a matrix multiplication using a unified rate distortion estimation. The method 600 can be implemented in the system 100 above or the electronic device 700 below.

At block 602, a codec being used to encode pixels is detected. For example, the codec may be the AVC code, the HEVC codec, or any other compatible codec.

At block 604, transform coefficients are looked up in a lookup table based on the detected codec. In some examples, syntax structures may be looked up in a lookup table based on the detected codec.

At block 606, a matrix multiplication is performed for rate distortion estimation based on the transform coefficients for the detected codec. In some examples, other operations may be performed using a uniform multi-codec unit. For example, using an array of two input multiplier element or adder arrays, along with accumulators, 2D DCT transform may be performed across different codecs. In some examples, an LUT may provide one of the inputs to the multiplier/adder array and the other input may be a residual (source_pixel-reference_pixel) input.

This process flow diagram is not intended to indicate that the blocks of the example method 600 are to be executed in any particular order, or that all of the blocks are to be included in every case. Further, any number of additional blocks not shown may be included within the example method 600, depending on the details of the specific implementation.

Figure 7:
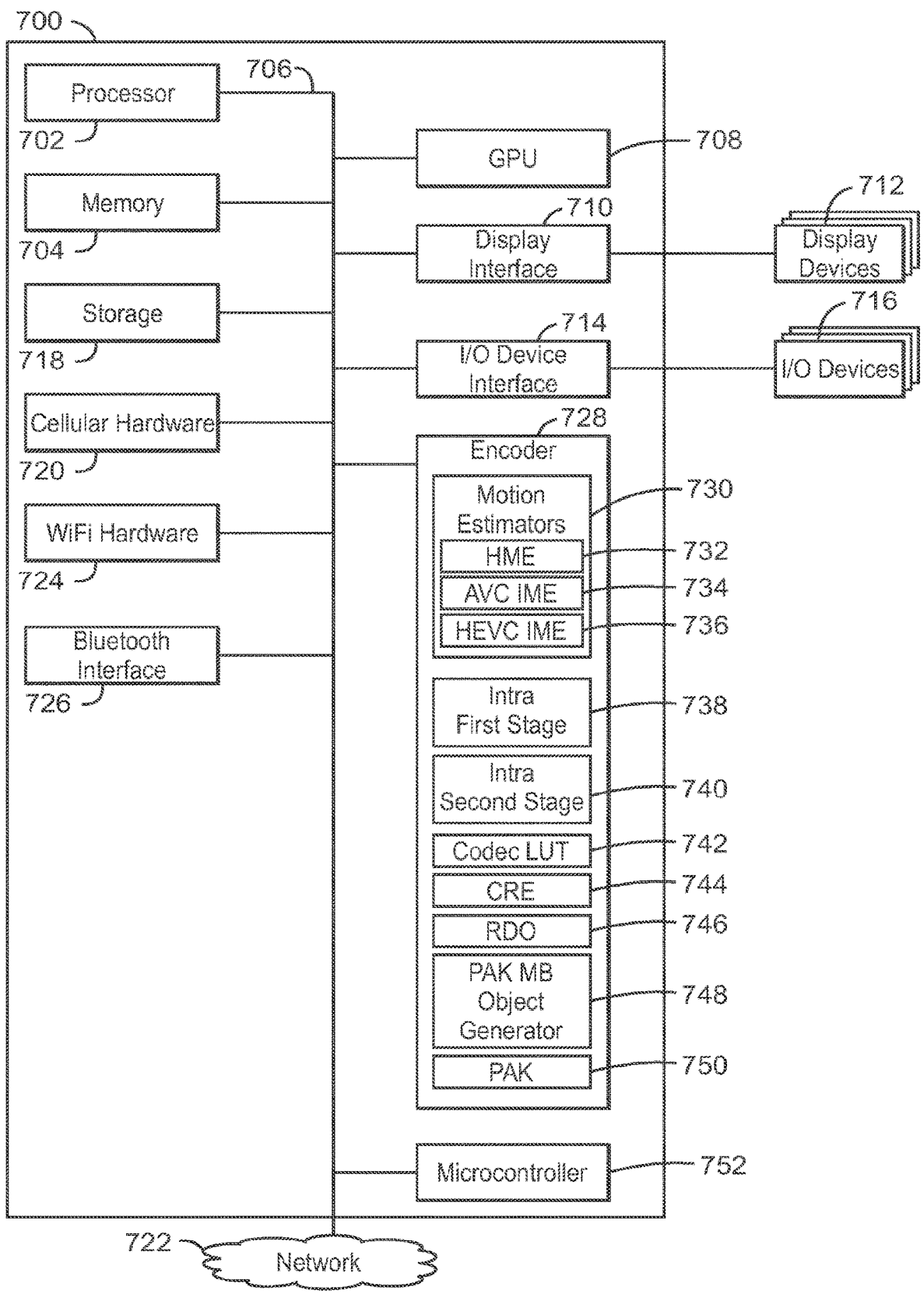
FIG. 7 is a block diagram illustrating an example electronic device that enables hardware video encoding with a two-stage intra search.

FIG. 7 is a block diagram of an electronic device 700 that enables hardware video encoding with a two-stage intra search. The electronic device 700 may be, for example, a server, laptop computer, tablet computer, mobile phone, smart phone, or a wearable device, drone, among others. The electronic device 700 may include a central processing unit (CPU) 702 that is configured to execute stored instructions, as well as a memory device 704 that stores instructions that are executable by the CPU 702. The CPU may be coupled to the memory device 704 by a bus 706. Additionally, the CPU 702 can be a single core processor, a multi-core processor, a computing cluster, or any number of other configurations. Furthermore, the electronic device 700 may include more than one CPU 702. The memory device 704 can include random access memory (RAM), read only memory (ROM), flash memory, or any other suitable memory systems. For example, the memory device 704 may include dynamic random access memory (DRAM).

The electronic device 700 also includes a graphics processing unit (GPU) 708. As shown, the CPU 702 can be coupled through the bus 706 to the GPU 708. The GPU 708 can be configured to perform any number of graphics operations within the electronic device 700. For example, the GPU 708 can be configured to render or manipulate graphics images, graphics frames, videos, or the like, to be displayed to a user of the electronic device 700. In some embodiments, the GPU 708 includes a number of graphics engines, wherein each graphics engine is configured to perform specific graphics tasks, or to execute specific types of workloads. For example, the GPU 708 may include an engine that processes video data via lossless pixel compression.

The CPU 702 can be linked through the bus 706 to a display interface 710 configured to connect the electronic device 700 to a plurality of display devices 712. The display devices 712 can include a display screen that is a built-in component of the electronic device 700. The display devices 712 can also include a computer monitor, television, or projector, among others, that is externally connected to the electronic device 700.

The CPU 702 can also be connected through the bus 706 to an input/output (I/O) device interface 714 configured to connect the electronic device 700 to one or more I/O devices 716. The I/O devices 716 can include, for example, a keyboard and a pointing device, wherein the pointing device can include a touchpad or a touchscreen, among others. The I/O devices 716 can be built-in components of the electronic device 700, or can be devices that are externally connected to the electronic device 700.

The electronic device 700 may also include a storage device 718. The storage device 718 is a physical memory such as a hard drive, an optical drive, a flash drive, an array of drives, or any combinations thereof. The storage device 718 can store user data, such as audio files, video files, audio/video files, and picture files, among others. The storage device 718 can also store programming code such as device drivers, software applications, operating systems, and the like. The programming code stored to the storage device 718 may be executed by the CPU 702, GPU 708, or any other processors that may be included in the electronic device 700.

The CPU 702 may be linked through the bus 706 to cellular hardware 720. The cellular hardware 720 may be any cellular technology, for example, the 4G standard (International Mobile Telecommunications-Advanced (IMT-Advanced) Standard promulgated by the International Telecommunications Union-Radio communication Sector (ITU-R)). In this manner, the electronic device 700 may access any network 722 without being tethered or paired to another device, where the network 722 is a cellular network.

The CPU 702 may also be linked through the bus 706 to WiFi hardware 724. The WiFi hardware is hardware according to WiFi standards (standards promulgated as Institute of Electrical and Electronics Engineers' (IEEE) 802.11 standards). The WiFi hardware 724 enables the electronic device 700 to connect to the Internet using the Transmission Control Protocol and the Internet Protocol (TCP/IP), where the network 722 is the Internet. Accordingly, the electronic device 700 can enable end-to-end connectivity with the Internet by addressing, routing, transmitting, and receiving data according to the TCP/IP protocol without the use of another device. Additionally, a Bluetooth Interface 726 may be coupled to the CPU 702 through the bus 706. The Bluetooth Interface 726 is an interface according to Bluetooth networks (based on the Bluetooth standard promulgated by the Bluetooth Special Interest Group). The Bluetooth Interface 726 enables the electronic device 700 to be paired with other Bluetooth enabled devices through a personal area network (PAN). Accordingly, the network 722 may be a PAN. Examples of Bluetooth enabled devices include a laptop computer, desktop computer, Ultrabook, tablet computer, mobile device, or server, among others.

The electronic device 700 may include an encoder 728. The encoder 728 may be a hardware encoder without programmable engines executing within the main loop of an encoder algorithm. In embodiments, this may be referred to as fixed function encoding. Generally, coding video data includes encoding the video to meet proper formats and specifications for recording and playback. The motion estimators 730 may be an algorithms executed by fixed function hardware of the encoder 728. Motion estimation is an important and computationally intensive task in video coding and video compression. In some examples, the motion estimators 730 may include an HME 732, an AVC IME 734, and an HEVC IME 736. For example, the HME 732 may perform a coarser grained search as described above. Parameters such as multi-pass packing (PAK) parameters may calculated based on a target size or bit rate by a PAK 732. In embodiments, the encoder can be used in an iterative fashion to enable conditional multi-pass encoding. For example, the encoder may use tile or frame based repetition.

The electronic device 700 includes an intra first stage 738. The intra first stage 738 can execute an intra search first stage on a video frame to generate intra candidates. For example, the intra first stage 738 can perform the intra first stage using source pixels of a neighboring block. In some examples, the intra first stage 738 can use prediction types of a different codec than the intra search second stage. In various examples, the intra first stage 738 can limit a number of 4×4 blocks to be searched in the intra search first stage. In some examples, intra first stage 738 can restrict intra angle support for 4×4 prediction units based on a block index.

The electronic device 700 also includes an intra second stage 740. The intra second stage 740 can execute an intra search second stage on the intra candidates to generate a final intra candidate and residuals. For example, the intra second stage 740 can perform the intra second stage using partially reconstructed pixels of a neighboring block or fully reconstructed pixels of the neighboring block. In some examples, the intra second stage 740 can interleave intra candidate sequencing across prediction unit candidates identified in the intra search first stage and prediction unit candidates within a coding unit to interleave smaller transform units.

The electronic device 700 further includes a codec lookup table (LUT) 742. The codec LUT 742 can store syntax structures and coefficients for a particular code, such as HEVC or AVC among other codecs. For example, a variable transform may be performed based on a detected codec using a set of coefficients associated with the codec and estimate a bit cost using a syntax structure from the codec lookup table. In some examples, the variable transform throughput may be performed using the same set of multipliers for a horizontal transform and a vertical transform.

The electronic device 700 further includes a check and refinement executer (CRE) 744. The CRE 744 may generate residuals based on one or more predictions. The electronic device 700 also includes an RDO 746 to calculate RDO costs for residuals. For example, the RDO 746 can calculate an RDO cost for a set of generated residuals for various candidates. In some examples, the RDO can include a forward transform and quantizer (FTQ) to transform residuals into the frequency domain and quantize the residuals. The RDO 746 may then calculate RDO costs for the quantized residuals.

The electronic device 700 also includes a PAK MB object generator 748 to execute a final mode decision for generating an LCU and generate a PAK MB object to send to a hardware bit packer (PAK) 750 for using to encode a frame. For example, the PAK MB object generator 748 can execute a final mode decision based on a comparison of the rate distortion optimization (RDO) costs. In various examples, the PAK MB object may include a combination of CU sizes and estimation types. The electronic device 700 thus includes a PAK 750 to encode a video frame using the received PAK MB object.

The electronic device 700 also includes a microcontroller 746. The microcontroller 746 may process information that is used to override functions of the encoder 728 or the PAK 750. This override may be enabled through costings and other statistics as described above. For example, the microcontroller 746 may be provided a histogram of luminance data for analysis and comparison with previous frames to determine in a fade-in or a fade-out event is occurring. In some examples, the histogram for each of two frames may be converted using a cumulative distribution function and an offset between the resulting curves may be used to determine a weight factor. The microcontroller 746 may compute average luminance difference between frames and generate a weighted prediction parameter to normalize variation in luminance in prediction of motion vectors. In some examples, the weighted prediction parameter may be included in a bit stream sent to a decoder so that the decoder may apply the same weight factor to accurately decode video frames.

The block diagram of FIG. 7 is not intended to indicate that the electronic device 700 is to include all of the components shown in FIG. 7. Rather, the computing system 700 can include fewer or additional components not illustrated in FIG. 7 (e.g., sensors, power management integrated circuits, additional network interfaces, etc.). The electronic device 700 may include any number of additional components not shown in FIG. 7, depending on the details of the specific implementation. Furthermore, any of the functionalities of the CPU 702 may be partially, or entirely, implemented in hardware and/or in a processor. For example, the functionality may be implemented with an application specific integrated circuit, in logic implemented in a processor, in logic implemented in a specialized graphics processing unit, or in any other device.

Figure 8:
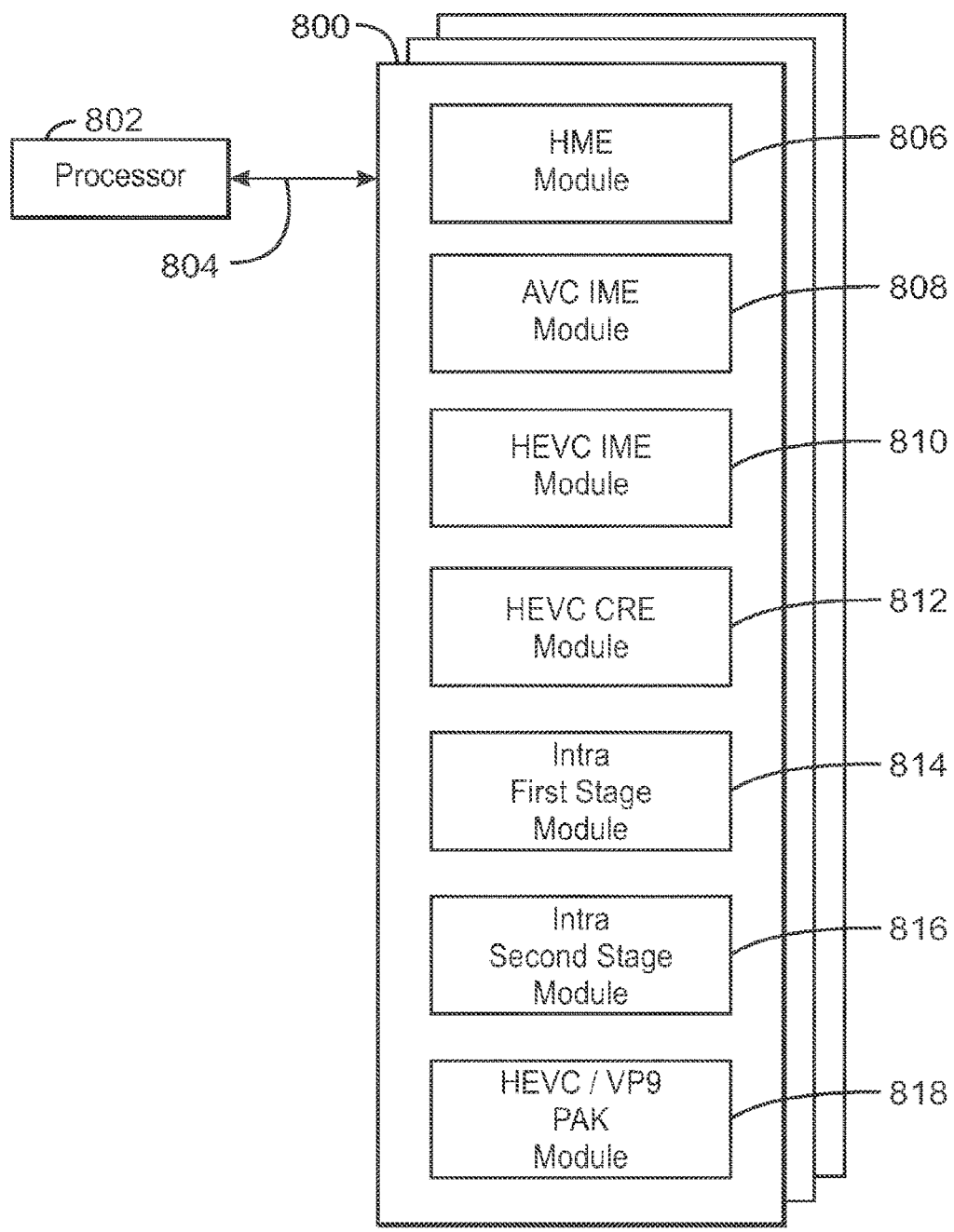
FIG. 8 is a block diagram showing an example medium that contains logic for hardware video encoding using a two-stage intra search.

FIG. 8 is a block diagram showing a medium 800 that contains logic for hardware video encoding using a two-stage intra search. The medium 800 may be a computer-readable medium, including a non-transitory medium that stores code that can be accessed by a processor 802 over a computer bus 804. For example, the computer-readable medium 800 can be volatile or non-volatile data storage device. The medium 800 can also be a logic unit, such as an Application Specific Integrated Circuit (ASIC), a Field Programmable Gate Array (FPGA), or an arrangement of logic gates implemented in one or more integrated circuits, for example.

The medium 800 may include modules 806-818 configured to perform the techniques described herein. For example, an HME module 806 may be configured to determine an encoding mode based on a downscaled motion estimation search. An AVC IME module 808 may be configured to execute an IME search. For example, the IME search may be based on the results of the dual HME search. An HEVC IME module 810 may perform a second IME search based on the results of the first IME search. An HEVC CRE module 812 includes code to execute a final mode decision and generate reconstructed pixels based on the final intra candidate and the residuals. The HEVC CRE module 812 includes code to calculate a rate distortion optimization (RDO) costs for the generated residuals and execute a final mode decision based on a comparison of the RDO costs of identified candidate types. The HEVC CRE module 812 may thus determine coding units and corresponding encoder modes in which to encode frames of video. An intra first stage module 814 includes code to execute an intra search first stage on a video frame to generate intra candidates. For example, the intra first stage module 814 includes code to perform the intra first stage using source pixels of a neighboring block. In some examples, the intra first stage module 814 includes code to use prediction types of a different codec than the intra search second stage. In various examples, the intra first stage module 814 includes code to limit a number of 4×4 blocks to be searched in the intra search first stage. In some examples, intra first stage module 814 includes code to restrict intra angle support for 4×4 prediction units based on a block index. An intra second stage module 816 includes code to execute an intra search second stage on the intra candidates to generate a final intra candidate and residuals. For example, the intra second stage module 816 includes code to perform the intra second stage using partially reconstructed pixels of a neighboring block or fully reconstructed pixels of the neighboring block. In some examples, the intra second stage module 816 includes code to interleave intra candidate sequencing across prediction unit candidates identified in the intra search first stage and prediction unit candidates within a coding unit to interleave smaller transform units. Finally, at block 818, a HEVC/VP9 PAK module packs bits into packets corresponding to the encoder mode decision for consumption by a consumer. For example, the packets may be sent to a decoder to unpack the packets into video frames.

The block diagram of FIG. 8 is not intended to indicate that the medium 800 is to include all of the components shown in FIG. 8. Further, the medium 800 may include any number of additional components not shown in FIG. 8, depending on the details of the specific implementation. For example, the medium 800 may also include code to a codec lookup table, wherein the processor 802 is to perform a variable transform based on a detected codec using a set of coefficients associated with the codec and estimate a bit cost using a syntax structure from the codec lookup table. In some examples, the medium 800 may also include code to perform variable transform throughput using the same set of multipliers for a horizontal transform and a vertical transform. Encoder algorithms must reduce a practically unlimited number of syntax and tool combinations defined by a specification into a single option that all decoders are able to understand. The present techniques result in an option that uses the least amount of power, or provides the most amount of video fidelity, or the most amount of compression, or some combination of these metrics. In embodiments, the present techniques focus on video compression at 4K resolution in low power with subjective video quality enhancements.

EXAMPLES

Example 1 is an apparatus for video encoding. The apparatus includes an encoder including an intra first stage to execute an intra search first stage on a video frame to generate intra candidates. The encoder also includes an intra second stage to execute an intra search second stage on the intra candidates to generate a final intra candidate and residuals. The apparatus also includes a check and refinement executer to execute a final mode decision and generate reconstructed pixels based on the final intra candidate and the residuals.

Example 2 includes the apparatus of example 1, including or excluding optional features. In this example, the apparatus includes a hardware bit packer (PAK) to pack bits as coded according to the final mode decision.

Example 3 includes the apparatus of any one of examples 1 to 2, including or excluding optional features. In this example, the encoder is to perform the intra first stage using partially reconstructed pixels from a previous final mode decision.

Example 4 includes the apparatus of any one of examples 1 to 3, including or excluding optional features. In this example, the encoder is to perform the intra second stage using partially reconstructed pixels of a neighboring block or fully reconstructed pixels of the neighboring block.

Example 5 includes the apparatus of any one of examples 1 to 4, including or excluding optional features. In this example, the encoder is to limit a number of 4×4 transform units to be searched.

Example 6 includes the apparatus of any one of examples 1 to 5, including or excluding optional features. In this example, the encoder is to restrict intra angle support for 4×4 prediction units based on a block index.

Example 7 includes the apparatus of any one of examples 1 to 6, including or excluding optional features. In this example, the encoder is to perform the intra search first stage using prediction types of a different codec than used in the intra search second stage.

Example 8 includes the apparatus of any one of examples 1 to 7, including or excluding optional features. In this example, the encoder is to interleave intra candidate sequencing across prediction unit candidates identified in the intra search first stage and prediction unit candidates within a coding unit to interleave smaller transform units.

Example 9 includes the apparatus of any one of examples 1 to 8, including or excluding optional features. In this example, the encoder is to perform a variable transform based on a detected codec using a set of coefficients associated with the codec and estimate a bit cost using a syntax structure from the codec lookup table.

Example 10 includes the apparatus of any one of examples 1 to 9, including or excluding optional features. In this example, the encoder is to perform variable transform throughput using the same set of multipliers for a horizontal transform and a vertical transform.

Example 11 is a method for hardware video encoding. The method includes executing an intra search first stage to generate intra candidates. The method also includes executing an intra search second stage using intra candidates to generate a final intra candidate. The method further includes executing a final mode decision and generate reconstructed pixels.

Example 12 includes the method of example 11, including or excluding optional features. In this example, executing the intra search first stage includes using source pixels of a neighboring block.

Example 13 includes the method of any one of examples 11 to 12, including or excluding optional features. In this example, executing the intra search second stage on the intra candidates includes using partially reconstructed pixels of a neighboring block or fully reconstructed pixels of the neighboring block.

Example 14 includes the method of any one of examples 11 to 13, including or excluding optional features. In this example, the method includes limiting a number of 4×4 blocks to be searched in the intra search first stage or the intra search second stage.

Example 15 includes the method of any one of examples 11 to 14, including or excluding optional features. In this example, the method includes restricting intra angle support for 4×4 prediction units based on a block index.

Example 16 includes the method of any one of examples 11 to 15, including or excluding optional features. In this example, executing the intra search first stage includes using a prediction type of a different codec than used in executing the intra search second stage.

Example 17 includes the method of any one of examples 11 to 16, including or excluding optional features. In this example, the method includes interleaving intra candidate sequencing across prediction unit candidates identified in the intra search first stage and prediction unit candidates within a coding unit to interleave smaller transform units.

Example 18 includes the method of any one of examples 11 to 17, including or excluding optional features. In this example, the method includes executing a skip check, an inter refinement, and an intra search, using nested loops to generate residuals.

Example 19 includes the method of any one of examples 11 to 18, including or excluding optional features. In this example, the method includes calculating a rate distortion optimization (RDO) cost for each of the generated residuals.

Example 20 includes the method of any one of examples 11 to 19, including or excluding optional features. In this example, the method includes comparing the rate distortion optimization (RDO) costs of the generated residuals to generate a largest coding unit (LCU) based on residuals with a lower RDO cost.

Example 21 is at least one computer readable medium for correcting gaze in images having instructions stored therein that direct the processor to execute an intra search first stage on a video frame to generate intra candidates. The computer-readable medium also includes instructions that direct the processor to execute an intra search second stage on the intra candidates to generate a final intra candidate and residuals. The computer-readable medium further includes instructions that direct the processor to execute a final mode decision and generate reconstructed pixels based on the final intra candidate and the residuals.

Example 22 includes the computer-readable medium of example 21, including or excluding optional features. In this example, the computer-readable medium includes instructions to perform the intra first stage using source pixels of a neighboring block.

Example 23 includes the computer-readable medium of any one of examples 21 to 22, including or excluding optional features. In this example, the computer-readable medium includes instructions to perform the intra second stage using partially reconstructed pixels of a neighboring block or fully reconstructed pixels of the neighboring block.

Example 24 includes the computer-readable medium of any one of examples 21 to 23, including or excluding optional features. In this example, the computer-readable medium includes instructions to limit a number of 4×4 blocks to be searched in the intra search first stage or the intra search second stage.

Example 25 includes the computer-readable medium of any one of examples 21 to 24, including or excluding optional features. In this example, the computer-readable medium includes instructions to restrict intra angle support for 4×4 prediction units based on a block index.

Example 26 includes the computer-readable medium of any one of examples 21 to 25, including or excluding optional features. In this example, the computer-readable medium includes instructions to use prediction types of a different codec in the intra search first stage than the intra search second stage.

Example 27 includes the computer-readable medium of any one of examples 21 to 26, including or excluding optional features. In this example, the computer-readable medium includes instructions to interleave intra candidate sequencing across prediction unit candidates identified in the intra search first stage and prediction unit candidates within a coding unit to interleave smaller transform units.

Example 28 includes the computer-readable medium of any one of examples 21 to 27, including or excluding optional features. In this example, the computer-readable medium includes instructions to perform a variable transform based on a detected codec using a set of coefficients associated with the codec and estimate a bit cost using a syntax structure from the codec lookup table.

Example 29 includes the computer-readable medium of any one of examples 21 to 28, including or excluding optional features. In this example, the computer-readable medium includes instructions to perform variable transform throughput using the same set of multipliers for a horizontal transform and a vertical transform.

Example 30 includes the computer-readable medium of any one of examples 21 to 29, including or excluding optional features. In this example, the computer-readable medium includes instructions to calculate rate distortion optimization (RDO) costs for the generated residuals and execute a final mode decision based on a comparison of the RDO costs of identified candidate types.

Example 31 is a system for video encoding. The system includes instructions that direct the processor to execute an intra search first stage on a video frame to generate intra candidates. The processor is to execute an intra search second stage on the intra candidates to generate a final intra candidate and residuals. The processor is to also execute a final mode decision and generate reconstructed pixels based on the final intra candidate and the residuals.

Example 32 includes the system of example 31, including or excluding optional features. In this example, the processor is to perform the intra first stage using source pixels of a neighboring block.

Example 33 includes the system of any one of examples 31 to 32, including or excluding optional features. In this example, the processor is to perform the intra second stage using partially reconstructed pixels of a neighboring block or fully reconstructed pixels of the neighboring block.

Example 34 includes the system of any one of examples 31 to 33, including or excluding optional features. In this example, the processor is to limit a number of 4×4 blocks to be searched in the intra search first stage or the intra search second stage.

Example 35 includes the system of any one of examples 31 to 34, including or excluding optional features. In this example, the processor is to restrict intra angle support for 4×4 prediction units based on a block index.

Example 36 includes the system of any one of examples 31 to 35, including or excluding optional features. In this example, the intra search first stage uses prediction types of a different codec than the intra search second stage.

Example 37 includes the system of any one of examples 31 to 36, including or excluding optional features. In this example, the processor is to interleave intra candidate sequencing across prediction unit candidates identified in the intra search first stage and prediction unit candidates within a coding unit to interleave smaller transform units.

Example 38 includes the system of any one of examples 31 to 37, including or excluding optional features. In this example, the system includes a codec lookup table. The processor is to perform a variable transform based on a detected codec using a set of coefficients associated with the codec and estimate a bit cost using a syntax structure from the codec lookup table.

Example 39 includes the system of any one of examples 31 to 38, including or excluding optional features. In this example, the processor is to perform variable transform throughput using the same set of multipliers for a horizontal transform and a vertical transform.

Example 40 includes the system of any one of examples 31 to 39, including or excluding optional features. In this example, the processor is to calculate rate distortion optimization (RDO) costs for the generated residuals and execute a final mode decision based on a comparison of the RDO costs of identified candidate types.

Example 41 is a system for correcting gaze in images. The system includes means for executing an intra search first stage on a video frame to generate intra candidates. The system also includes means for executing an intra search second stage on the intra candidates to generate a final intra candidate and residuals. The system further includes means for executing a final mode decision and generate reconstructed pixels based on the final intra candidate and the residuals.

Example 42 includes the system of example 41, including or excluding optional features. In this example, the means for executing the intra search first stage is to perform the intra first stage using source pixels of a neighboring block.

Example 43 includes the system of any one of examples 41 to 42, including or excluding optional features. In this example, the means for executing the intra search second stage is to perform the intra second stage using partially reconstructed pixels of a neighboring block or fully reconstructed pixels of the neighboring block.

Example 44 includes the system of any one of examples 41 to 43, including or excluding optional features. In this example, the system includes means for limiting a number of 4×4 blocks to be searched in the intra search first stage or the intra search second stage.

Example 45 includes the system of any one of examples 41 to 44, including or excluding optional features. In this example, the system includes means for restricting intra angle support for 4×4 prediction units based on a block index.

Example 46 includes the system of any one of examples 41 to 45, including or excluding optional features. In this example, the means for executing the intra search first stage is to use prediction types of a different codec than the intra search second stage.

Example 47 includes the system of any one of examples 41 to 46, including or excluding optional features. In this example, the system includes means for interleaving intra candidate sequencing across prediction unit candidates identified in the intra search first stage and prediction unit candidates within a coding unit to interleave smaller transform units.

Example 48 includes the system of any one of examples 41 to 47, including or excluding optional features. In this example, the system includes means for performing a variable transform based on a detected codec using a set of coefficients associated with the codec and estimating a bit cost using a syntax structure from the codec lookup table.

Example 49 includes the system of any one of examples 41 to 48, including or excluding optional features. In this example, the system includes means for performing variable transform throughput using the same set of multipliers for a horizontal transform and a vertical transform.

Example 50 includes the system of any one of examples 41 to 49, including or excluding optional features. In this example, the processor is to calculate rate distortion optimization (RDO) costs for the generated residuals and execute a final mode decision based on a comparison of the RDO costs of identified candidate types.

It is to be understood that specifics in the aforementioned examples may be used anywhere in one or more embodiments. For instance, all optional features of the electronic device described above may also be implemented with respect to either of the methods or the computer-readable medium described herein. Furthermore, although flow diagrams and/or state diagrams may have been used herein to describe embodiments, the techniques are not limited to those diagrams or to corresponding descriptions herein. For example, flow need not move through each illustrated box or state or in exactly the same order as illustrated and described herein.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. An apparatus to encode video, the apparatus comprising:
    memory; and
    an encoder to:
        perform an intra search first stage based on source pixels of a source video frame to determine first intra candidates to predict a block of the source video frame;
        perform an intra search second stage based on reconstructed pixels of neighboring blocks associated with the first intra candidates to determine a second intra candidate, the intra search first stage to use a prediction type of a different codec than the intra search second stage; and
        encode the block of the source video frame based on the second intra candidate.

2. The apparatus of claim 1, wherein the source pixels of the source video frame include respective source pixels of the neighboring blocks associated with the first intra candidates,
    and the reconstructed pixels of the neighboring blocks associated with the first intra candidates are different from the source pixels of the neighboring blocks associated with the first intra candidates.

3. The apparatus of claim 2, wherein the reconstructed pixels of the neighboring blocks are based on previously encoded versions of the neighboring blocks.

4. The apparatus of claim 1, wherein the intra search first stage is to use a plurality of prediction angles to determine the first intra candidates,
    and the intra search second stage is to use a subset of the plurality of prediction angles to determine the second intra candidate from the first intra candidates.

5. The apparatus of claim 1, wherein the intra search second stage is to determine the second intra candidate based on evaluation of a coding cost,
    and the intra search first stage is not to use the coding cost to determine the first intra candidates.

6. The apparatus of claim 1, wherein the block of the source video frame corresponds to a coding unit.

7. At least one storage device comprising computer readable instructions that, when executed, cause one or more processors to at least:
    execute an intra search first stage based on source pixels of a source video frame to determine first intra candidates to predict a block of the source video frame;
    execute an intra search second stage based on reconstructed pixels of neighboring blocks associated with the first intra candidates to determine a second intra candidate, the intra search first stage to use a prediction type of a different codec than the intra search second stage; and
    encode the block of the source video frame based on the second intra candidate.

8. The at least one storage device of claim 7, wherein the source pixels of the source video frame include respective source pixels of the neighboring blocks associated with the first intra candidates,
    and the reconstructed pixels of the neighboring blocks associated with the first intra candidates are different from the source pixels of the neighboring blocks associated with the first intra candidates.

9. The at least one storage device of claim 8, wherein the reconstructed pixels of the neighboring blocks are based on previously encoded versions of the neighboring blocks.

10. The at least one storage device of claim 7, wherein the intra search first stage is to use a plurality of prediction angles to determine the first intra candidates,
    and the intra search second stage is to use a subset of the plurality of prediction angles to determine the second intra candidate from the first intra candidates.

11. The at least one storage device of claim 7, wherein the intra search second stage is to determine the second intra candidate based on evaluation of a coding cost, and the intra search first stage is not to use the coding cost to determine the first intra candidates.

12. The at least one storage device of claim 7, wherein the block of the source video frame corresponds to a coding unit.

13. A system to encode video, the system comprising:
    memory; and
    at least one processor to:
        execute an intra search first stage on a video frame to determine first intra candidates to predict a block of the video frame;
        perform an intra search second stage on the first intra candidates to determine a second intra candidate, the intra search first stage to use a prediction type of a different codec than the intra search second stage; and
        encode the block of the video frame based on the second intra candidate.

14. The system of claim 13, wherein the processor is to perform the intra search first stage based on a plurality of prediction angles to determine the first intra candidates,
    and the processor is to perform the intra search second stage based on a subset of the plurality of prediction angles to determine the second intra candidate from the first intra candidates.

15. The system of claim 13, wherein the processor is to perform the intra search first stage based on source pixels of the video frame,
    and the processor is to perform the intra search second stage based on reconstructed pixels of neighboring blocks associated with the first intra candidates.

16. The system of claim 15, wherein the source pixels of the video frame include respective source pixels of the neighboring blocks associated with the first intra candidates,
and the reconstructed pixels of the neighboring blocks associated with the first intra candidates are different from the source pixels of the neighboring blocks associated with the first intra candidates.

17. The system of claim 16, wherein the reconstructed pixels of the neighboring blocks are based on previously encoded versions of the neighboring blocks.

18. The system of claim 13, wherein the intra search second stage is based on a coding cost,
and the intra search first stage is not based on the coding cost.

* * * * *